(12) United States Patent
Yoshikawa

(10) Patent No.: US 11,787,046 B2
(45) Date of Patent: Oct. 17, 2023

(54) CONTROL DEVICE, ROBOT SYSTEM, AND DISPLAY METHOD

(71) Applicant: Seiko Epson Corporation, Tokyo (JP)

(72) Inventor: Kengo Yoshikawa, Azumino (JP)

(73) Assignee: SEIKO EPSON CORPORATION

( * ) Notice: Subject to any disclaimer, the term of this patent is extended or adjusted under 35 U.S.C. 154(b) by 394 days.

(21) Appl. No.: 16/776,872

(22) Filed: Jan. 30, 2020

(65) Prior Publication Data

US 2020/0246968 A1    Aug. 6, 2020

(30) Foreign Application Priority Data

Jan. 31, 2019 (JP) ................................. 2019-016018

(51) Int. Cl.
*B25J 9/16* (2006.01)
*B25J 13/08* (2006.01)
*B25J 9/04* (2006.01)

(52) U.S. Cl.
CPC ............. *B25J 9/1612* (2013.01); *B25J 9/042* (2013.01); *B25J 13/08* (2013.01)

(58) Field of Classification Search
CPC ........... B25J 13/08; B25J 9/042; B25J 9/1612
See application file for complete search history.

(56) References Cited

U.S. PATENT DOCUMENTS

| | | | | |
|---|---|---|---|---|
| 6,057,813 | A * | 5/2000 | Matsumoto ........ | H04N 5/44504 345/25 |
| 6,597,971 | B2 * | 7/2003 | Kanno ................... | B25J 9/1666 901/7 |
| 7,114,157 | B2 * | 9/2006 | Chaffee .................. | G06Q 40/08 710/36 |
| 10,442,085 | B2 * | 10/2019 | Yamamoto ............. | B25J 19/063 |
| 10,870,201 | B2 * | 12/2020 | Motoyoshi ............. | B25J 13/088 |
| 2013/0255426 | A1 * | 10/2013 | Kassow ................. | B25J 9/1671 901/23 |

(Continued)

FOREIGN PATENT DOCUMENTS

JP        2016-059989 A       4/2016

*Primary Examiner* — Khoi H Tran
*Assistant Examiner* — Rodney P King
(74) *Attorney, Agent, or Firm* — Harness, Dickey & Pierce, P.L.C.

(57) ABSTRACT

There is provided a control device that controls a robot based on a work sequence in which a plurality of commands including a first command and a second command are arrayed, the control device including a display control section configured to display the work sequence on a display section, and a storing section configured to store display position relation information including first display position relation information indicating a relative first display position relation between a display position of the first command in the work sequence displayed on the display section and a display position of the second command in the work sequence displayed on the display section. The display control section causes the display section to display attention calling information when a relative display position relation between the first command and the second command and the first display position relation indicated by the first display position relation information stored in the storing section coincide in the work sequence. The first command is a command for operating a hand.

17 Claims, 13 Drawing Sheets

(56) References Cited

U.S. PATENT DOCUMENTS

| | | | |
|---|---|---|---|
| 2015/0045949 A1* | 2/2015 | Hashiguchi | B25J 9/1664 700/264 |
| 2016/0046020 A1* | 2/2016 | Chuo | B25J 9/1615 901/23 |
| 2019/0114482 A1* | 4/2019 | Li | G06V 20/10 |
| 2019/0299401 A1* | 10/2019 | Sugiyama | B25J 9/1664 |

* cited by examiner

CONTROL DEVICE, ROBOT SYSTEM, AND DISPLAY METHOD

The present application is based on, and claims priority from JP Application Serial Number 2019-016018, filed Jan. 31, 2019, the disclosure of which is hereby incorporated by reference herein in its entirety.

BACKGROUND

1. Technical Field

The present disclosure relates to a control device, a robot system, and a display method.

2. Related Art

There has been known a user interface that can, by arraying a plurality of commands to be executed by a robot control device that controls a robot, intuitively create a work sequence to be executed by the robot control device (see United States Patent Application Publication No. 2013/0255426 (Patent Literature 1).

When a command for operating a hand of the robot is used in such a user interface, the hand of the robot sometimes interferes with another object depending on a display position relation on a work sequence between the command and another command. For example, a user unaccustomed to creation of a work sequence of the robot is highly like to unintentionally cause a display position relation among a plurality of commands arrayed as a work sequence to coincide with a display position relation in which the hand is highly likely to interfere with another object.

SUMMARY

A control device according to an aspect of the present disclosure controls a robot based on a work sequence in which a plurality of commands including a first command and a second command are arrayed. The control device includes: a display control section configured to display the work sequence on a display section; and a storing section configured to store display position relation information including first display position relation information indicating a relative first display position relation between a display position of the first command in the work sequence displayed on the display section and a display position of the second command in the work sequence displayed on the display section. The display control section causes the display section to display attention calling information when a relative display position relation between the first command and the second command and the first display position relation indicated by the first display position relation information stored in the storing section coincide in the work sequence. The first command is a command for operating a hand.

DESCRIPTION OF EXEMPLARY EMBODIMENTS

Embodiment

Figure 1:
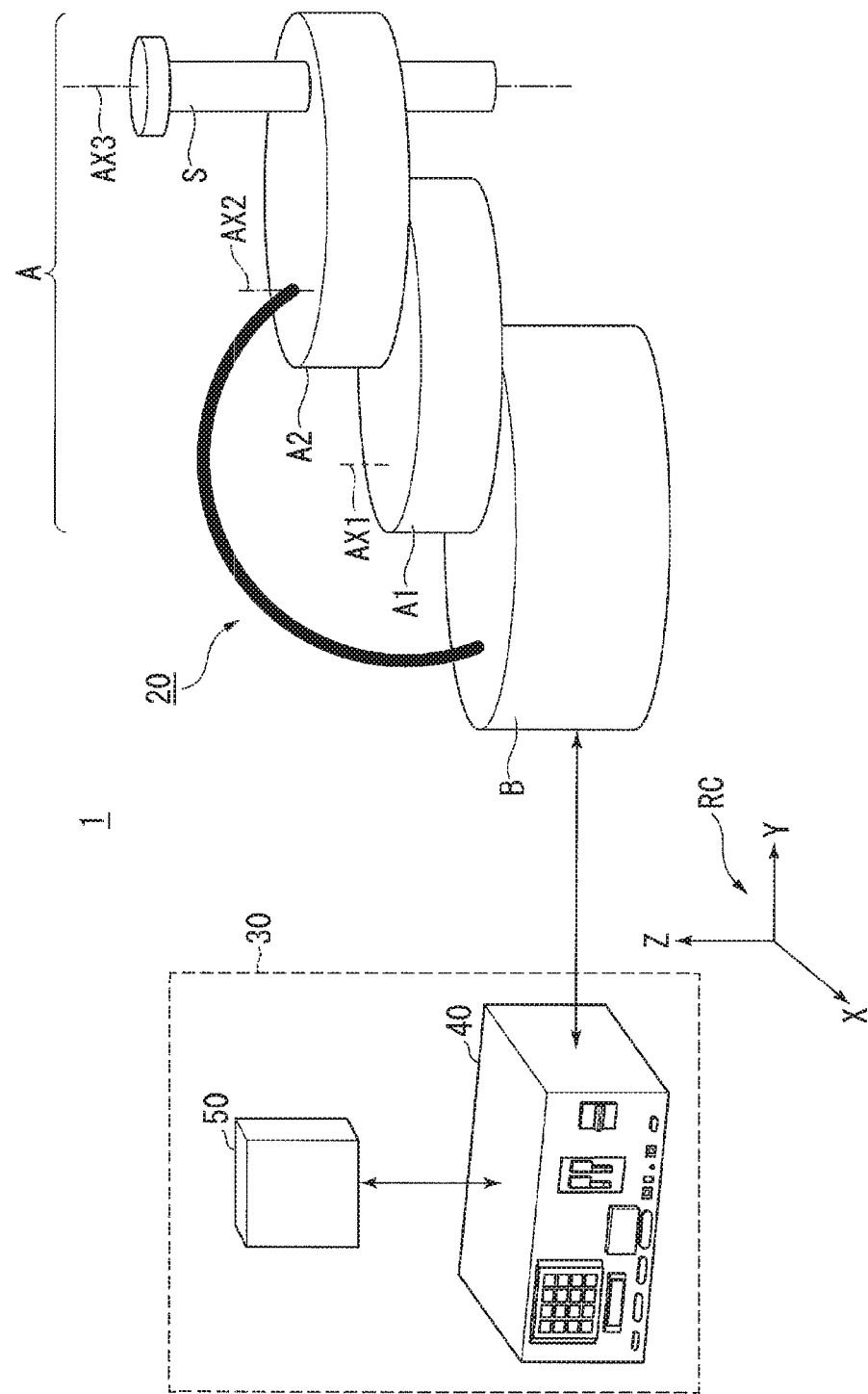
FIG. 1 is a diagram showing an example of the configuration of a robot system according to an embodiment.

An embodiment of the present disclosure is explained below with reference to the drawings.
Configuration of a Robot System
First, the configuration of a robot system 1 according to the embodiment is explained with reference to FIG. 1. FIG. 1 is a diagram showing an example of the configuration of the robot system 1 according to the embodiment.

The robot system 1 includes, for example, a robot 20 and a control device 30. The control device 30 includes a robot control device 40 and an information processing device 50. The robot system 1 may include other devices in addition to these devices. In the robot system 1, the robot control device 40 may be configured integrally with the information processing device 50. In this case, in the robot system 1, the control device 30 is the robot control device 40 itself configured integrally with the information processing device 50.

The robot 20 is a SCARA robot. The SCARA robot is sometimes called horizontal articulated robot. The robot 20 may be another robot such as a vertical articulated robot instead of the SCARA robot. The vertical articulated robot means a single-arm robot including one arm, a plural-arm robot including two or more arms, or the like. The plural-arm robot including the two arms is sometimes called double-arm robot.

In the example shown in FIG. 1, the robot 20 is set on a predetermined setting surface. The setting surface is, for example, a floor surface of a room in which the robot 20 is set. Instead of the floor surface, the setting surface may be a wall surface of the room, a ceiling surface of the room, an upper surface of a table, an upper surface of a jig, or an upper surface of a stand, may be an outdoor floor surface, an outdoor wall surface, or the like, or may be another surface.

In the following explanation, for convenience of explanation, a direction from the center of gravity of the robot 20 to the setting surface among directions orthogonal to the setting surface is referred to as downward or downward direction and a direction opposite to the downward direction is referred to as upward or upward direction. In the following explanation, as an example, the downward direction coincides with a negative direction of a Z axis in a robot coordinate system RC. The robot coordinate system RC means a robot coordinate system of the robot 20. In the following explanation, as an example, the downward direction coincides with the gravity direction. Instead of these directions, the downward direction may not coincide with one or both of the negative direction and the gravity direction.

The robot 20 includes a base B and a movable section A supported by the base B.

The base B is set not to move on the setting surface.

The movable section A includes a first arm A1, a second arm A2, and a shaft S. The first arm A1 is supported turnably around a first turning axis AX1 by the base B. The second arm A2 is supported turnably around a second turning axis AX2 by the first arm A1. The shaft S is supported turnably around a third turning axis AX3 and translatably in an axial direction of the third turning axis AX3 by the second arm A2.

More specifically, in the movable section A, the shaft S is a shaft body having a substantially columnar shape. A ball screw groove and a spline groove are respectively formed on the circumferential surface of the shaft S. In FIG. 1, to simplify the figure, the ball screw groove and the spline groove formed on the circumferential surface of the shaft S are respectively omitted. As shown in FIG. 1, the shaft S is provided to pierce through an end portion on the opposite side of the first arm A1 among end portions of the second arm A2 in the up-down direction.

An external device can be attached to the lower end portion of the shaft S. The external device is, for example, an end effector but may be a device other than the end effector. The lower end portion of the shaft S means an end portion on the lower side among end portions of the shaft S.

The end effector attached to the lower end portion of the shaft S is, in this embodiment, for example, an end effector capable of pinching and gripping an object with fingers. The end effector may be an end effector capable of attracting the object with air, magnetism, or the like instead of the end effector capable of pinching and gripping the object.

The first arm A1 turns around the first turning axis AX1 and moves in the horizontal direction. The horizontal direction is a direction orthogonal to the up-down direction. That is, in this embodiment, the horizontal direction is a direction along an XY plane formed by an X axis and a Y axis in the robot coordinate system RC.

The first arm A1 is turned around the first turning axis AX1 by a not-shown first actuator. That is, in this embodiment, the first turning axis AX1 means an imaginary axis coinciding with a turning axis of the first actuator. The first actuator is, for example, a servomotor. The first actuator is included in the base B. The first actuator may be included in the first arm A1. The first actuator may be another actuator instead of the servomotor. The first turning axis AX1 may be an imaginary axis not coinciding with the turning axis of the first actuator. The horizontal direction may be a direction not orthogonal to the up-down direction instead of the direction orthogonal to the up-down direction. The horizontal direction may be a direction not along the XY plane instead of the direction along the XY plane.

The second arm A2 turns around the second turning axis AX2 and moves in the horizontal direction. The second arm A2 is turned around the second turning axis AX2 by a not-shown second actuator. That is, in this embodiment, the second turning axis AX2 means an imaginary axis coinciding with a tuning axis of the second actuator. The second actuator is, for example, a servomotor. The second actuator is included in the second arm A2. The second actuator may be included in the first arm A1. The second actuator may be another actuator instead of the servomotor. The second tuning axis AX2 may be an imaginary axis not coinciding with the turning axis of the second actuator.

The second arm A2 includes a not-shown third actuator and a not-shown fourth actuator. The second arm A2 supports the shaft S.

The third actuator is, for example, a servomotor. The third actuator turns, with a timing belt or the like, a ball screw nut provided in the outer peripheral portion of the ball screw groove of the shaft S. By turning the ball screw nut, the third actuator moves the shaft S in the up-down direction. The third actuator may be another actuator instead of the servomotor.

The fourth actuator is, for example, a servomotor. The fourth actuator turns, with a timing belt or the like, a ball spline nut provided in the outer circumferential portion of the spline groove of the shaft S. By turning the ball spline nut, the fourth actuator turns the shaft S around the third turning axis AX3. The fourth actuator may be another actuator instead of the servomotor.

The third turning axis AX3 means an imaginary axis coinciding with the center axis of the shaft S. The third turning axis AX3 may be an imaginary axis not coinciding with the center axis of the shaft S.

The robot control device 40 controls the robot 20. For example, the robot control device 40 controls the robot 20 based on an operation program stored in advance. For example, the robot control device 40 controls the robot 20 based on an operation program generated by the information processing device 50 explained below.

The robot control device 40 is communicably coupled to each of the robot 20 and the information processing device 50 by a cable. Wired communication via the cable is performed according to a standard such as Ethernet (registered trademark) or USB. The robot control device 40 may be connected to one or both of the robot 20 and the information processing device 50 by wireless communication performed according to a communication standard such as Wi-Fi (registered trademark).

The information processing device 50 is, for example, a notebook PC (Personal Computer). The information processing device 50 may be another information processing device such as a work station, a desktop PC, a tablet PC, a multifunction cellular phone terminal (a smartphone), a cellular phone terminal, or a PDA (Personal Digital Assistant).

The information processing device 50 generates the operation program according to operation received from a user. More specifically, the information processing device 50 generates, according to the operation, a work sequence in which a plurality of commands are arrayed. The respective plurality of commands include a part or all of one or more kinds of first operation commands, one or more kinds of second operation commands, one or more kinds of processing commands, and one or more kinds of logical commands. The respective plurality of commands may include other commands instead of or in addition to these commands.

The respective one or more kinds of the first operation commands mean commands for causing the robot 20 to perform operations corresponding to the kinds of the first operation commands. In the following explanation, as an example, there are three kinds of the first operation commands. The respective three kinds of the first operation commands are, for example, respective first operation commands C11 to C13. The first operation command C11 means the first operation command for initializing the respective first to fourth actuators included in the movable section A of the robot 20. The first operation command C12 means the first operation command for operating the movable section A. In this embodiment, the robot 20 is a SCARA robot. Therefore, when moving the movable section A in a Z-axis direction in the robot coordinate system RC according to the first operation command C12, the robot 20 moves the shaft S. When moving the movable section A in one or both of an X-axis direction and a Y-axis direction in the robot coordinate system RC according to the first operation command C12, the robot 20 moves one or both of the first arm A1 and the second arm A2. The first operation command C13 means the first operation command for causing the movable section A to perform a pallet repetitive motion. The respective three kinds of the first operation commands may include commands for causing the movable section A to perform other operations instead of a part or all of these commands.

One or more kinds of first properties are associated with a part or all of the three kinds of the first operation commands. The respective one or more kinds of the first properties associated with a certain kind of the first operation command means information for designating an attribute of operation corresponding to the kind, a method of the operation, and the like. For example, information for designating a moving destination of the movable section A, information for designating speed for operating the movable section A, information for designating a method of the operation of the movable section A, and the like are associated with the first operation command C11 as the first properties. The method of the operation of the movable section A means, for example, a method of operation of the movable section A by PTP (Point To Point) control, a method of operation by CP (Continuous Path) control, and a method of operation by control for minimizing turning angles of joints of the movable section A. Other information may be associated with the first operation command C11 as the first properties instead of or in addition to these kinds of information. The first properties may be associated with not all of the three kinds of the first operation commands.

The operation of the movable section A means operation for changing a position and a posture of a TCP (Tool Center Point) of the movable section A. Speed of the operation of the movable section A may be represented by, for example, speed of movement of the TCP or may be represented by speed of movement of another part of the robot 20 such as a joint of the robot 20. In the following explanation, as an example, the speed of the operation of the movable section A is represented by the speed of the movement of the TCP. In the following explanation, for convenience of explanation, moving the TCP to a certain position is referred to as moving the movable section A to the position.

The one or more kinds of the second operation commands mean commands for causing external devices attached to the robot 20 to perform operation corresponding to the kinds of the second operation commands.

In the following explanation, as an example, the external devices are two external devices: a hand and a camera. The hand means an end effector capable of gripping an object with a plurality of fingers among end effectors attachable to the robot 20. The camera is a camera that images a region where work is performed by the robot 20. The external devices may be other devices attachable to the robot 20 instead of one or both of the hand and the camera.

In the following explanation, as an example, there are two kinds of the second operation commands. The respective two kinds of the second operation commands are, for example, respective second operation commands C21 and C22. The second operation command C21 means the second operation command for operating the hand attached to the robot 20. The second operation command C22 means the second operation command for operating the camera attached to the robot 20. The respective two kinds of the second operation commands may be, instead of these commands, commands for causing the external devices attached to the robot 20 to perform other operations.

One or more kinds of second properties are associated with one or both of the two kinds of the second operation commands. The respective one or more kinds of the second properties associated with a certain kind of the second operation command mean information for designating attributes of operations corresponding to the kinds, methods of the operations, and the like. For example, information for designating opening and closing of the hand as the operation of the hand is associated with the second operation command C21 as the second property. The information for designating the opening and closing of the hand means information for designating, as the operation of the hand, operation for moving the plurality of fingers of the hand in a direction in which the plurality of fingers move away from one another and opening the hand, information for designating, as the operation of the hand, operation for moving the plurality of fingers of the hand in a direction in which the plurality of hands move close to one another and closing the hand, and the like. Other information for designating an attribute of the operation of the hand, a method of the operation, and the like may be associated with the second operation command C21 as the second properties instead of or in addition to the information for designating the opening and closing of the hand. The second properties may be associated with not all of the two kinds of the second operation commands.

In the following explanation, for convenience of explanation, when it is unnecessary to distinguish the first operation commands and the second operation commands, the first operation commands and the second operation commands are collectively referred to as operation commands.

The respective one or more kinds of the processing commands mean commands for causing the robot control device or the information processing device 50 to perform processing corresponding to the kinds of the processing commands. In the following explanation, as an example, there are five kinds of the processing commands. The respective five kinds of the processing commands are, for example, respective processing commands C31 to C35. The processing command C31 means a processing command for putting the robot control device 40 on standby for execution of a command by the robot control device 40. The processing command C32 mean a processing command for causing the robot control device 40 to output various signals to other devices. The processing command C33 means a processing command for causing the information processing device 50 to display various messages on a display section 55 of the information processing device 50. The processing command C34 means a processing command for causing the information processing device 50 to display a comment on a work sequence displayed on the display section 55 of the information processing device 50. The processing command C35 means a processing command for causing the robot control device 40 to stop execution of a command by the robot control device 40. The respective five kinds of the processing commands may be, instead of these processing commands, commands for causing the robot control device 40 or the information processing device 50 to perform other processing.

One or more kinds of third properties are associated with one or all of the five kinds of the processing commands. The respective one or more kinds of the third properties associated with a certain kind of the processing command mean information for designating an attribute of processing corresponding to the kind, a target on which the processing is performed, content of the processing, and the like. For example, information for designating a time for putting the robot control device 40 on standby for execution of a command by the robot control device 40 is associated with the processing command C31 as the third property. Other information may be associated with the processing command C31 as the third properties instead of or in addition to the information. For example, information for designating a kind of a signal to be output by the robot control device 40, information for designating a device at an output destination of the signal, and the like are associated with the processing command C32 as the third properties. Other information may be associated with the processing command C32 as the third properties instead of or in addition to these kinds of information. The third properties may be associated with not all of the five kinds of the processing commands.

The respective one or more kinds of the logical structure commands mean commands for designating a logical structure for specifying order of execution of various commands arrayed on a work sequence. In the following explanation, as an example, there are two kinds of the logical structure commands. The respective two kinds of the logical structure commands are, for example, respective logical structure commands C41 and C42. The logical structure command C41 means a logical structure command for dividing the order of the execution of the various commands. The logical structure command C42 means a logical structure command for repeating the execution of the various commands. The various commands include one or both of one or more operation commands and one or more processing commands.

One or more kinds of fourth properties are associated with a part or all of the two kinds of the logical structure commands. The respective one or more kinds of the fourth properties associated with a certain kind of the logical structure command mean information for designating an attribute of a logical structure corresponding to the kind, a condition in the logical structure, and the like. For example, information for designating a condition for dividing order for executing various commands is associated with the logical structure command C41 as the fourth property. The condition is equivalent to a condition represented by, for example, a conditional expression of a for statement in the C language. Other information may be associated with the logical structure command C41 as the fourth properties instead of or in addition to the information. The fourth properties may be associated with not all of the two kinds of the logical structure commands.

In the following explanation, for convenience of explanation, when it is unnecessary to distinguish the first to fourth properties from one another, the first to fourth properties are collectively referred to as properties. In the following explanation, for convenience of explanation, when it is unnecessary to distinguish a part or all of one or more operation commands, one or more processing commands, and one or more logical structure commands, the commands are collectively referred to as various commands. That is, in the following explanation, when the commands are referred to as the various commands, the various commands indicate a part or all of the one or more operation commands, the one or more processing commands, and the one or more logical structure commands. In the following explanation, for convenience of explanation, when it is unnecessary to distinguish the operation commands, the processing commands, and the logical structure commands from one another, the commands are collectively referred to as commands. That is, in the following explanation, when the commands are simply referred to as the commands, the commands indicate any one of the operation commands, the processing commands, and the logical structure commands.

The information processing device 50 causes the display section 55 to display a generated work sequence. The information processing device 50 performs, according to operation received from the user, update such as a change of order, addition of commands, and deletion of commands concerning the various commands arrayed as the work sequence displayed on the display section 55 in this way. The information processing device 50 generates, according to operation received from the user, an operation program based on the work sequence displayed on the display section 55. The information processing device 50 outputs the generated operation program to the robot control device 40 and causes the robot control device 40 to execute the operation program.

The user operates the information processing device 50 and creates a work sequence by arraying a plurality of commands in order desired by the user. Therefore, when arraying the plurality of commands as the work sequence, the user sometimes causes any one of display position relations among at least a part of commands among the plurality of commands arrayed as the work sequence to coincide with an undesirable display position relation. An undesirable display position relation among certain two or more commands means a display position relation between the two or more commands at the time when it is highly likely that the robot 20 performs an unintended operation because the two or more commands are executed. The unintended operation of the robot 20 means, for example, operation in which the robot 20 interferes with another object. In this embodiment, a display position relation between two or more commands displayed on a certain image means a relative position relation among display positions of the two or more commands on the image. In this embodiment, a display position of a certain command means a position where the command is displayed among positions on an image on which the command is displayed.

Even when any one of the display position relations between the two or more commands among the plurality of commands arrayed as the work sequence coincides with the undesirable display position relation, the user sometimes does not notice that the display position relation between the two or more commands coincides with the undesirable display position relation. This is more highly likely to occur as the user is less accustomed to creation of a work sequence.

Therefore, when any one of the display position relations between the two or more commands among the plurality of commands arrayed as the work sequence is the undesirable display position relation, the information processing device 50 displays attention calling information on the display section 55. The attention calling information is information for calling attention to the effect that the display position relation between the two or more commands is the undesirable display position relation.

More specifically, in the information processing device 50, display position relation information is stored in a memory 52 in advance by the user or a manufacturer. The display position relation information means information including one or more kinds of information indicating one or more display position relations. The display position relation information indicates a display position relation indicated by each of the one or more kinds of information included in the display position relation information. The respective one or more kinds of information are information indicating a relative display position relation among predetermined two or more commands among a plurality of commands that can be arrayed as a work sequence.

When any one of display position relations between two or more commands among a plurality of commands arrayed as a work sequence displayed on the display section 55 coincides with any one of the one or more display position relations indicated by the display position relation information stored in the memory 52 in advance, the information processing device 50 causes the display section 55 to display attention calling information. Consequently, the information processing device 50, that is, the control device 30 can prevent the robot 20 from performing an unintended operation according to a work sequence created by the user. Specifically, for example, the control device 30 can prevent the robot 20 from interfering with another object according to the work sequence created by the user.

The configuration of such an information processing device 50 and processing in which the information processing device 50 displays attention calling information are respectively explained in detail below.

Hardware Configuration of the Information Processing Device

Figure 2:
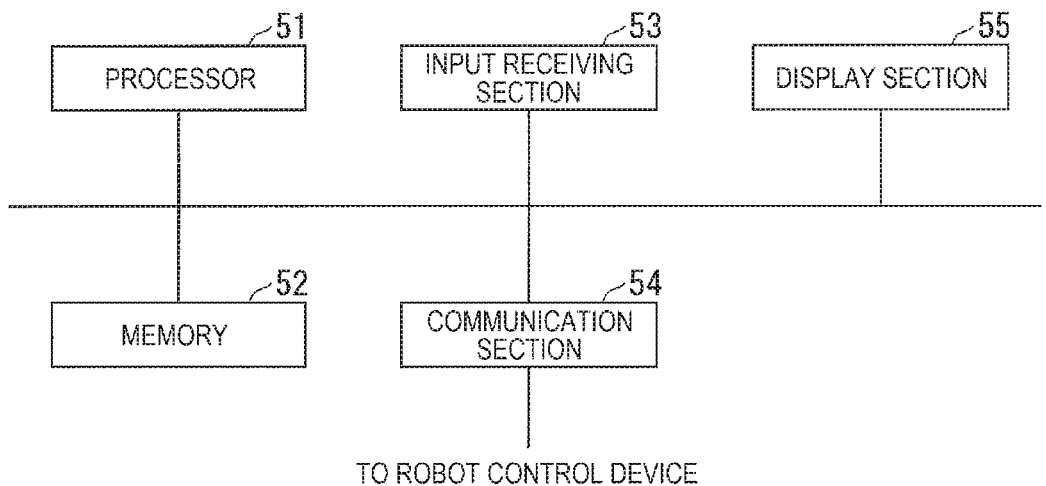
FIG. 2 is a diagram showing an example of a hardware configuration of an information processing device.

A hardware configuration of the information processing device 50 is explained below with reference to FIG. 2. FIG. 2 is a diagram showing an example of the hardware configuration of the information processing device 50.

The information processing device 50 includes, for example, a processor 51, the memory 52, an input receiving section 53, a communication section 54, and the display section 55. These components are communicably coupled to one another via a bus. The information processing device 50 performs communication with the robot control device 40 via the communication section 54.

The processor 51 is, for example, a CPU (Central Processing Unit). The processor 51 may be another processor such as an FPGA (Field Programmable Gate Array) instead of the CPU. The processor 51 executes various programs stored in the memory 52.

The memory 52 includes, for example, a HDD (Hard Disk Drive), an SSD (Solid State Drive), an EEPROM (Electrically Erasable Programmable Read-Only Memory), a ROM (Read-Only Memory), or a RAM (Random Access Memory). The memory 52 may be an external storage device coupled by a digital input and output port such as a USB instead of a storage device incorporated in the information processing device 50. The memory 52 stores various kinds of information, various images, various programs, and the like to be processed by the information processing device 50. The memory 52 is an example of the storing section.

The input receiving section 53 is, for example, a keyboard, a mouse, a touch pad, or another input device. The input receiving section 53 may be, instead of these devices, a touch panel configured integrally with the display section 55. The input receiving section 53 may be separated from the information processing device 50. In this case, the input receiving section 53 is communicably coupled to the information processing device 50 by wire or radio.

The communication section 54 includes a digital input and output port such as a USB or an Ethernet (registered trademark) port.

The display section 55 is, for example, a liquid crystal display panel or an organic EL (Electro Luminescence) display panel. The display section 55 may be separated from the information processing device 50. In this case, the display section 55 is communicably coupled to the information processing device 50 by wire or radio.

Functional Configuration of the Information Processing Device

Figure 3:
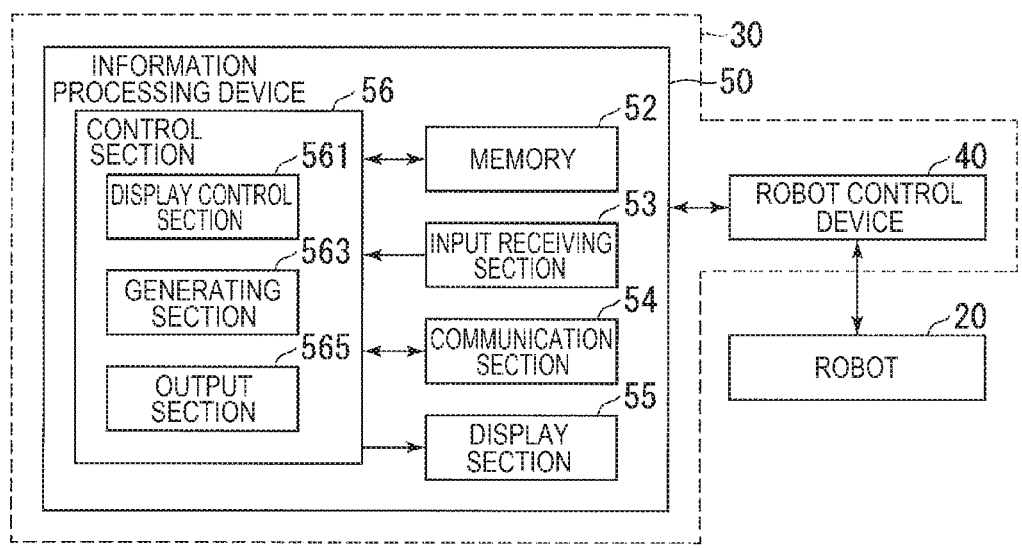
FIG. 3 is a diagram showing an example of a functional configuration of the information processing device.

A functional configuration of the information processing device 50 is explained below with reference to FIG. 3. FIG. 3 is a diagram showing an example of the functional configuration of the information processing device 50.

The information processing device 50 includes the memory 52, the input receiving section 53, the communication section 54, the display section 55, and a control section 56.

The control section 56 controls the entire information processing device 50. The control section 56 includes a display control section 561, a generating section 563, and an output section 565. These functional sections included in the control section 56 are realized by, for example, the processor 51 executing various programs stored in the memory 52. A part or all of the functional sections may be hardware functional sections such as an LSI (Large Scale Integration) and an ASIC (Application Specific Integrated Circuit).

The display control section 561 generates various images that the display control section 561 causes the display section 55 to display. The display control section 561 causes the display section 55 to display the generated images. For example, the display control section 561 generates, according to operation received from the user, a work sequence creation image for creating a work sequence. The display control section 561 causes the display section 55 to display the generated work sequence.

The generating section 563 generates an operation program according to operation received from the user via the work sequence creation image and based on a work sequence displayed on the work sequence creation image.

The output section 565 outputs the operation program generated by the generating section 563 to the robot control device 40 according to operation received from the user via the work sequence creation image.

Configuration Example of the Work Sequence Creation Image

Figure 4:
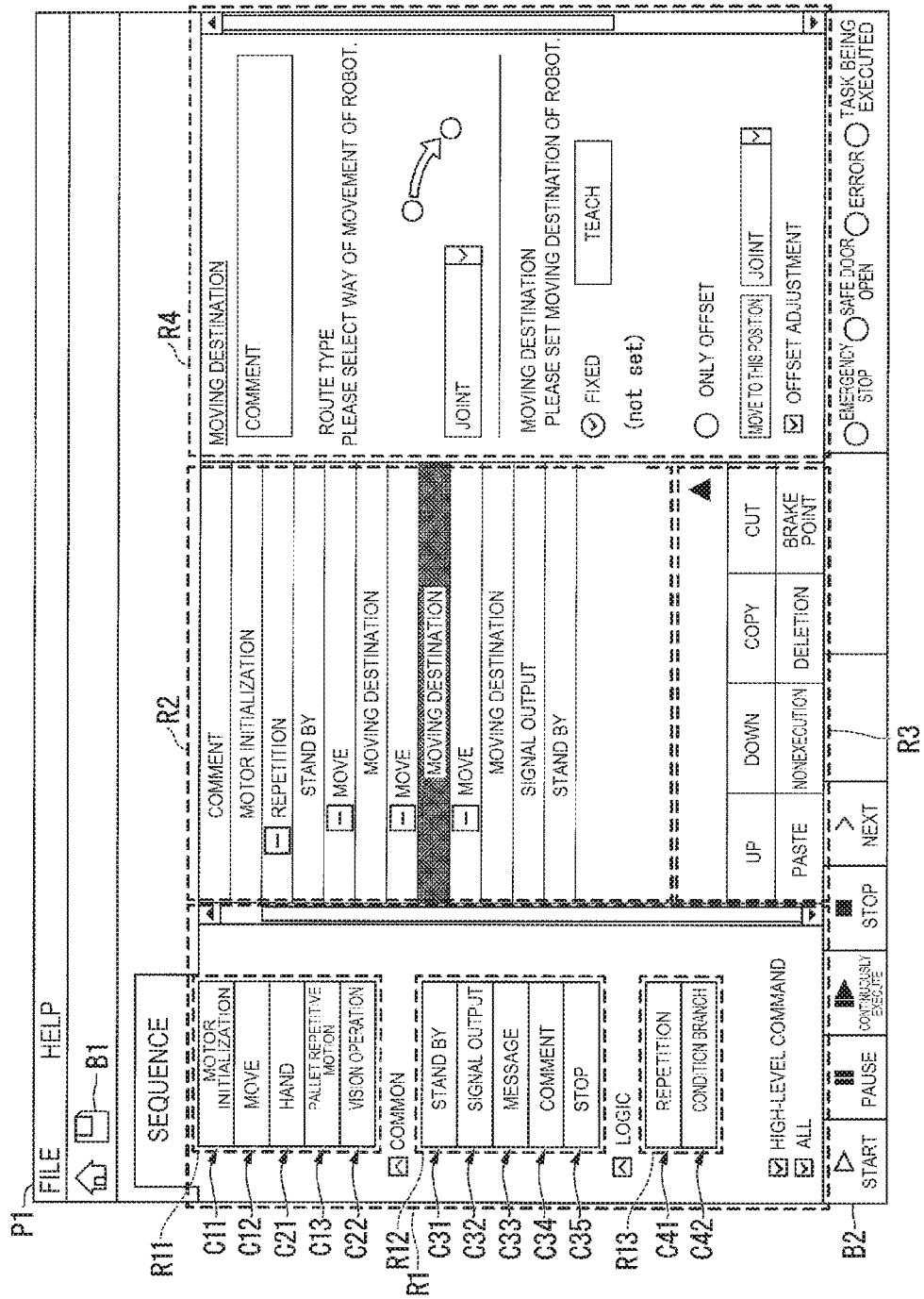
FIG. 4 is a diagram showing an example of a work sequence creation image: an image shown in FIG. 4 is an example of the work sequence creation image.

A configuration example of the work sequence creation image is explained below with reference to FIG. 4. FIG. 4 is a diagram showing an example of the work sequence creation image. An image P1 shown in FIG. 4 is an example of the work sequence creation image.

For example, four regions R1 to R4 and two buttons B1 and B2 are included in the image P1 as GUIs (Graphical User Interfaces). Other GUIs may be included in the image P1 in addition to these six GUIs.

The region R1 means a region where information indicating a respective plurality of commands that can be arrayed as a work sequence is displayed. The user can create a work sequence in the region R2 by selecting one of a plurality of kinds of information displayed in the region R1 and arraying a command indicated by the selected one kind of information in a display position desired by the user in the region R2 explained below. For example, the user can array one of the plurality of kinds of information displayed in the region R1 in the display position desired by the user in the region R2 by dragging and dropping the information. That is, when selecting one of the plurality of kinds of information displayed in the region R1 and receiving, from the user, arraying operation for arraying a command indicated by the selected one kind of information in a display position desired by the user in the region R2, the display control section 561 displays and arrays the command in the display position in the region R2.

Three regions R11 to R13 are included in the region R1 as GUIs.

The region R11 means a region where information indicating a respective plurality of operation commands is displayed. In the example shown in FIG. 4, five kinds of information including information indicating the respective first operation commands C11 to C13 and information indicating the respective second operation commands C21 and C22 are displayed in the region R11.

The region R12 means a region where information indicating a respective plurality of processing commands is displayed. In the example shown in FIG. 4, information indicating the respective processing commands C31 to C35 is displayed in the region R12.

The region R13 means a region where information indicating a respective plurality of logical structure commands is displayed. In the example shown in FIG. 4, information indicating the respective logical structure commands C41 and C42 is displayed in the region R13.

The region R2 means a region where commands indicated by the respective kinds of information displayed in the region R1 are arrayed as a work sequence. In other words, the region R2 means a region where the work sequence is created by arraying the commands indicated by the respective kinds of information displayed in the region R1. Further, in other words, the region R2 means a region where a work sequence in which a plurality of commands are arrayed by the user is displayed. In the example shown in FIG. 4, twelve commands are arrayed in the region R2 by the user.

In the region R2, concerning a command associated with a certain property among the commands arrayed in the region R2, the property is displayed as a low order node of the command together with the command. When a certain command is arrayed in the region R2 by the user, the display control section 561 displays the command in the region R2 and displays a property associated with the command in the region R2 as a low order node of the command. For example, when the command is the first operation command C12, a first property for designating the speed for operating the movable section A, a first property for designating the moving destination of the movable section A, a first property for designating the method of the operation of the movable section A, and the like are displayed in the region R2 as low order nodes of the first operation command C12.

In the region R2, the user can select a command desired by the user among one or more commands arrayed in the region R2. Concerning the command selected in the region R2, the user can execute a change of a display position in the region R2, deletion from the region R2, copy and paste in the region R2, cut in the region R2, addition of a break point, and the like by performing operation on any one of GUIs displayed in the region R3 explained below.

In the region R2, the user can select a property desired by the user among one or more properties displayed in the region R2. The user can execute editing of content designated by the property selected in the region R2 by performing operation on any one of GUIs displayed in the region R4 explained below.

The region R3 means a region where, concerning the command selected by the user in the region R2, GUIs for receiving operation such as a change of a display position in the region R2, deletion from the region R2, copy and paste in the region R2, cut in the region R2, and addition of a break point are displayed. The GUIs are, for example, buttons. The GUIs may be other GUIs such as a pulldown menu instead of the buttons. Concerning the command selected by the user in the region R2, the display control section 561 performs a change of a display position in the region R2, deletion from the region R2, copy and paste in the region R2, cut in the region R2, addition of a break point, and the like according to operation received from the user via the region R3.

The region R4 means a region where editing of content designated by the property selected by the user in the region R2 is performed. When a certain property is selected by the user in the region R2, the display control section 561 displays, in the region R4, an image for editing content designated by the property. In the example shown in FIG. 4, an image for performing editing of content of a first property associated with the first operation command C12 is displayed in the region R4. In this example, the first property selected by the user in the region R2 is shown as a property hatched in the region R2.

The button B1 is a button for causing the memory 52 to store the work sequence displayed in the region R2. When operation is received on the button B1 from the user, the display control section 561 causes the memory 52 to store the work sequence.

The button B2 is a button for outputting an operation program based on the work sequence displayed in the region R2 to the robot control device 40 and causing the robot control device 40 to execute the operation program. When operation is received on the button B2 from the user, the generating section 563 generates an operation program based on the work sequence. The output section 565 outputs the operation program generated by the generating section 563 to the robot control device 40 and causes the robot control device 40 to execute the operation program. Consequently, the robot control device 40 can control the robot 20 based on the operation program.

Figure 5:
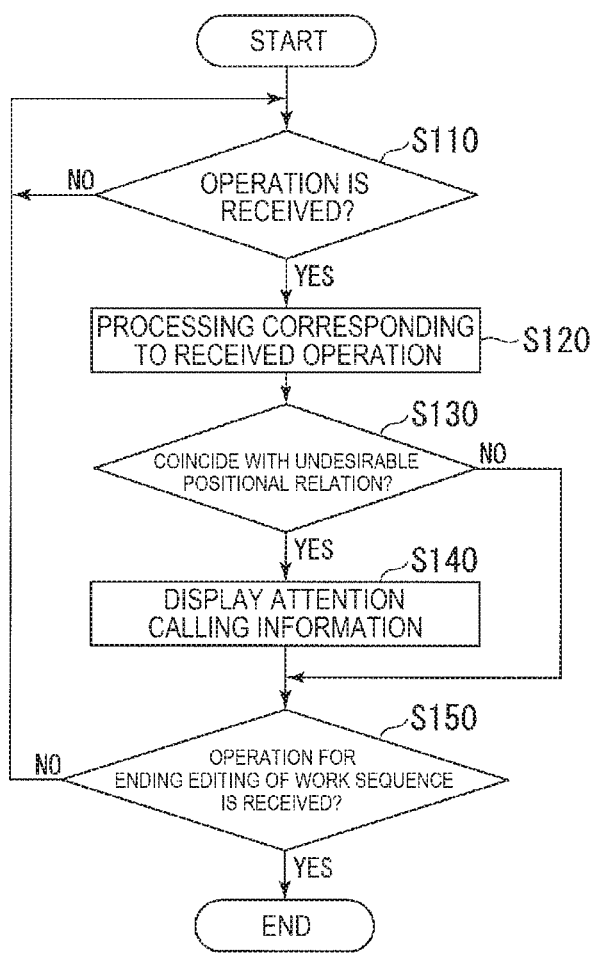
FIG. 5 is a diagram showing an example of a flow of processing for displaying attention calling information in the work sequence creation image in processing performed by the information processing device.

Processing for Displaying Attention Calling Information in a Work Sequence Creation Image Processing for displaying attention calling information in a work sequence creation image in the processing performed by the information processing device 50 is explained below with reference to FIG. 5. FIG. 5 is a diagram showing an example of a flow of processing for displaying attention calling information in the work sequence creation image in the processing performed by the information processing device 50.

The display control section 561 stays on standby until the display control section 561 receives operation for changing a display position relation among a plurality of commands arrayed in the region R2 as a work sequence (step S110). The operation means, for example, arraying operation for arraying, in the region R2, any one of a plurality of commands displayed in the region R1 and changing operation for performing, concerning a command selected in the region R2, a change of a display position in the region R2 of the command, deletion of the command, and the like.

When receiving the operation for changing the display position relation of the plurality of commands arrayed in the region R2 as the work sequence (YES in step S110), the display control section 561 performs processing corresponding to the operation (step S120). For example, when the received operation is arraying operation, the display control section 561 displays and arrays a command designated by the arraying operation in a display position designated by the arraying operation in the region R2. For example, when the received operation is changing operation, the display control section 561 performs, according to the changing operation, concerning the command selected in the region R2, a change of a display position in the region R2 of the command, deletion of the command, and the like.

Subsequently, the display control section 561 determines whether any one of display position relations between two or more commands among the plurality of commands arrayed as the work sequence in the region R2 coincides with an undesirable display position relation (step S130).

The processing of step S130 is explained. The display control section 561 reads out, from the memory 52, display position relation information stored in the memory 52 in advance. The display control section 561 determines whether any one of the display position relations between the two or more commands among the plurality of commands arrayed as the work sequence in the region R2 coincides with any one of one or more position relations indicated by the display position relation information read out from the memory 52. When determining that any one of the display position relations between the two or more commands coincides with none of the one or more display position relations, the display control section 561 determines that none of the display position relations between the two or more commands coincides with the undesirable display position relation. On the other hand, when determining that any one of the position relations between the two or more commands coincides with any one of the one or more display position relations, the display control section 561 determines that any one of the two or more display position relations coincides with the undesirable display position relation.

When determining that none of the display position relations between the two or more commands among the plurality of commands arrayed as the work sequence in the region R2 coincide with the undesirable display position relation (NO in step S130), the display control section 561 determines whether operation for ending the editing of a work sequence is received from the user (step S150). The operation means, for example, operation on the button B2 and operation for performing deletion of display of a work sequence creation image on the display section 55.

When determining that the operation for ending the editing of the work sequence is not received from the user (NO in step S150), the display control section 561 shifts to step S110 and stays on standby again until operation for changing the display position relations among the plurality of commands arrayed in the region R2 as the work sequence is received.

On the other hand, when determining that the operation for ending the editing of the work sequence is received from the user (YES in step S150), the display control section 561 ends the processing.

On the other hand, when determining that any one of the display position relations between the two or more commands among the plurality of commands arrayed as the work sequence in the region R2 coincides with the undesirable display position relation (YES in step S130), the display control section 561 causes the display section 55 to display the attention calling information explained above (step S140). The attention calling information may be a message for performing the attention calling with a sentence, may be an image for performing the attention calling with a sign or the like, or may be another kind of information for performing the attention calling. After the processing of step S140 is performed, the display section 55 shifts to step S150.

When any one of the display position relations between the two or more commands among the plurality of commands arrayed as the work sequence in the region R2 coincides with the undesirable display position relation, the information processing device 50 causes the display section 55 to display the attention calling information. Consequently, the information processing device 50, that is, the control device 30 can prevent the robot 20 from performing unintended operation according to the work sequence created by the user. Specifically, for example, the control device 30 can prevent the robot 20 from interfering with another object according to the work sequence created by the user.

Timing when the display control section 561 displays the attention calling information may be timing immediately after the display control section 561 determines that all of the display position relations between the two or more commands among the plurality of commands arrayed as the work sequence in the region R2 coincide with the undesirable display position relation, may be timing when operation on the button B1 or the button B2 is received from the user, or may be other timing.

A Specific Example 1 of the Undesirable Display Position Relation and a Display Example 1 of the Attention Calling Information A specific example 1 of the undesirable display position relation among the display position relations among the plurality of commands arrayed as the work sequence and a display example 1 of the attention calling information are explained with reference to FIG. 6.

Figure 6:
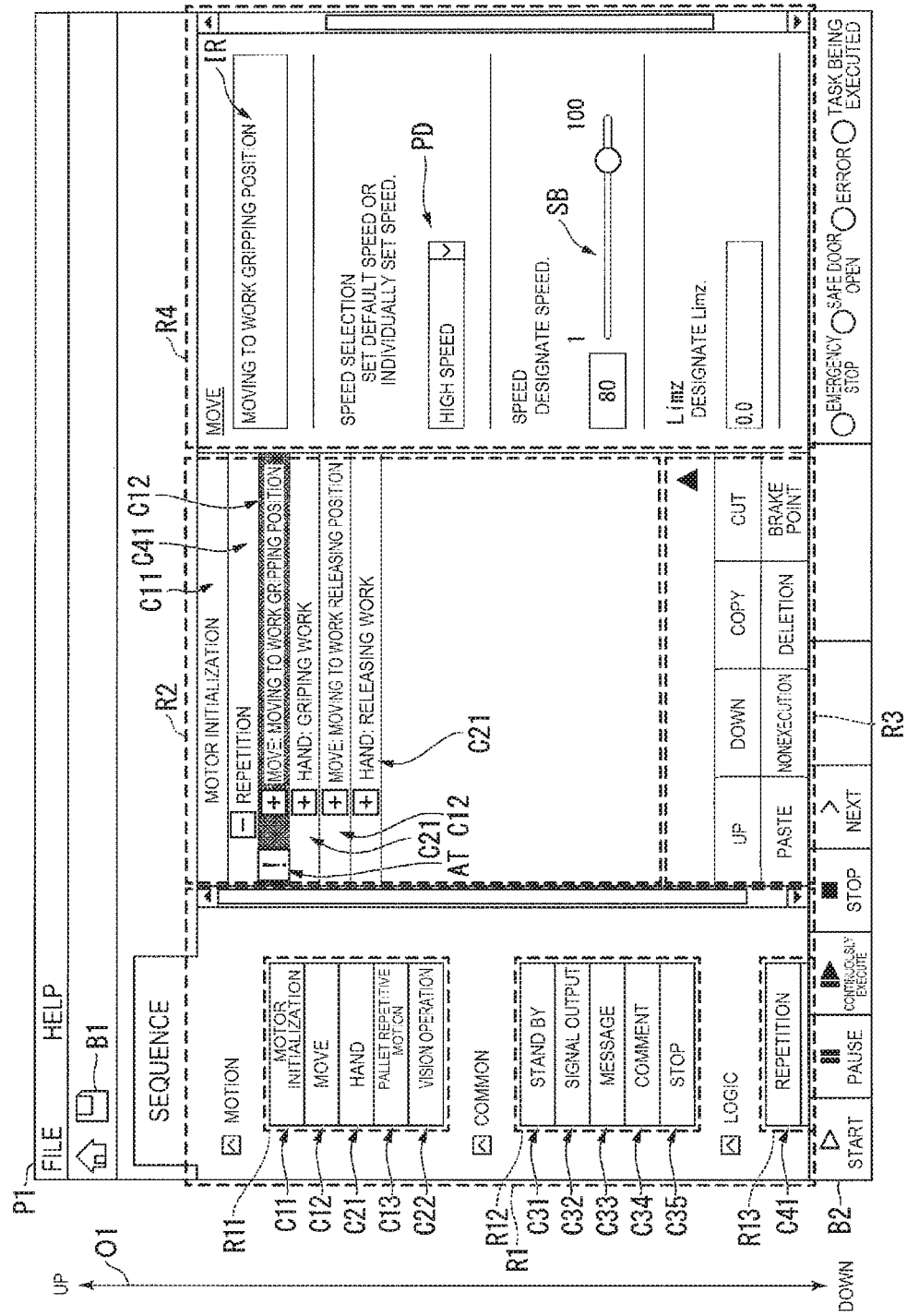
FIG. 6 is a diagram showing an example of the image displayed when the attention calling information is displayed.

FIG. 6 is a diagram showing an example of the image P1 displayed when the attention calling information is displayed. An arrow O1 shown in FIG. 6 indicates the up-down direction in the image P1 shown in FIG. 6. In the example shown in FIG. 6, six commands, that is, the first operation command C11, the logical structure command C41, the first operation command C12, the second operation command C21, the first operation command C12, and the second operation command C21 are arrayed from the top to the bottom in the region R2. In this example, properties are associated with respective two first operation commands C12, respective two second operation commands C21, and one logical structure command C41. However, in this example, the properties are folded and are not displayed in the region R2. In this example, in the region R2, a first first operation command C12 counted from the top is selected by the user. Therefore, images for editing contents of respective three first properties associated with the first operation command C12 are displayed in the region R4. As shown in FIG. 6, the three first properties are respectively a first property for designating the moving destination of the movable section A, a first property for designating the speed for operating the movable section A, and a first property for designating the method of the operation of the movable section A. In the region R4 shown in FIG. 6, an image for editing the first property for designating the method of the operation of the movable section A is slid upward by scroll in the region R4 and is hidden.

In the example shown in FIG. 6, a fourth property for designating a condition for repeatedly executing target processing is associated with a first logical structure command C41 counted from the top in the region R2. However, as explained above, in this example, the fourth property is folded and is hidden in the region R2.

In the example shown in FIG. 6, in the region R2, commands repeatedly executed by the logical structure command C41, that is, the respective two first operation commands C12 and the respective two second operation commands C21 are displayed as low order nodes together with the logical structure command C41. Display positions where the four commands are displayed as the low order nodes of the logical structure command C41 among display positions in the region R2 are examples of associated display positions associated with the logical structure command C41. The associated display positions are display positions where the commands serving as the low order nodes of the logical structure command C41 are located among the display positions in the region R2.

In the example shown in FIG. 6, the first first operation command C12 counted from the top in the region R2 is shown as "move: moving to a work gripping position". This indicates that, in FIG. 6, a first property for designating the "work gripping position" as the moving destination of the movable section A is associated with the first operation command C12. However, as explained above, in this example, the first property is folded and is hidden in the region R2. Although not shown in the region R2, in the following explanation, as an example, a first property for designating "high speed" as the speed for operating the movable section A is associated with the first operation command C12. Although not shown in the region R2, in the following explanation, as an example, a first property for designating a "method of operation by control for minimizing turning angles of joints of the movable section A" as the method of the operation of the movable section A is associated with the first operation command C12. Actually, the "work gripping position" is represented by, for example, a coordinate in the robot coordinate system RC, a predetermined taught teaching point, or the like.

In the example shown in FIG. 6, a first second operation command C21 counted from the top in the region R2 is shown as "hand: gripping work". This indicates that, in FIG. 6, a second property for designating "moving the plurality of fingers of the hand in the direction in which the plurality of fingers move close to one another and closing the hand" as the operation of the hand is associated with the second operation command C21. However, as explained above, in this example, the second property is folded and is hidden in the region R2.

In the example shown in FIG. 6, a second first operation command C12 counted from the top in the region R2 is shown as "move: moving to a work releasing position". This indicates that, in FIG. 6, a first property for designating the "work releasing position" as the moving destination of the movable section A is associated with the first operation command C12. However, as explained above, in this example, the first property is folded and is hidden in the region R2. Although not shown in FIG. 6, in the following explanation, as an example, a first property for designating "low speed" as the speed for operating the movable section A is associated with the first operation command C12. Although not shown in the region R2, in the following explanation, as an example, a first property for designating the "method of operation by control for minimizing turning angles of joints of the movable section A" as the method of the operation of the movable section A is associated with the first operation command C12. The "work releasing position" is actually represented by, for example, a coordinate in the robot coordinate system RC, a predetermined taught teaching point, or the like.

In the example shown in FIG. 6, a second second operation command C21 counted from the top in the region R2 is shown as "hand: releasing work". This indicates that, in FIG. 6, a second property for designating "moving the plurality of fingers of the hand in the direction in which the plurality of fingers move away from one another and opening the hand" as the operation of the hand is associated with the second operation command C21. However, as explained above, in this example, the second property is folded and is hidden in the region R2.

In the example shown in FIG. 6, the region R4 includes a pulldown menu SR hidden upward by scroll in FIG. 6, an input field IR, a pulldown menu PD, and a slide bar SB as GUIs.

The pulldown menu SR is a GUI for displaying a list of respective methods of a plurality of operations predetermined as methods of the operation of the movable section A. When receiving operation from the user in a predetermined position of the pulldown menu SR, the pulldown menu SR displays the list. The pulldown menu SR displays, according to operation received from the user for the list, in a display field of the pulldown menu SR, a method of operation selected by the user among the methods of the plurality of operations and deletes the display of the list.

The input field IR is a field to which information indicating the moving destination of the movable section A is input. In the example shown in FIG. 6, "moving to a work gripping position" is input as the information. In this case, the display control section 561 associates a first property for designating the "work gripping position" as the moving destination of the movable section A with the first first operation command C12 counted from the top in the region R2.

The pulldown menu PD is a GUI that displays a list of respective speeds in a plurality of stages predetermined as the speed for operating the movable section A and speeds designated by the user using the slide bar SB. In the following explanation, as an example, the plurality of stages are three stages. In the following explanation, as an example, speeds in the three stages are respectively low speed, medium speed, and high speed. The low speed indicates speed lower than the medium speed. The medium speed indicates speed lower than the high speed. The high speed indicates speed that is 20% or more of speed highest as the speed for operating the movable section A. In the following explanation, for convenience of explanation, the speed designated by the user using the slide bar SB is referred to as custom speed. That is, the pulldown menu PD is a GUI for displaying a list of four speeds, that is, the low speed, the medium speed, the high speed, and the custom speed. When operation is received from the user in a position predetermined in the pulldown menu PD, the pulldown menu PD displays the list. The pulldown menu PD displays, according to operation received from the user for the list, speed selected by the user among the four speeds in a display field of the pulldown menu PD and deletes the display of the list. In the example shown in FIG. 6, the high speed is displayed in the pulldown menu PD. That is, in this example, the high speed is selected as the speed for operating the movable section A.

The slide bar SB is a slide bar capable of designating, when the custom speed is displayed in the display field of the pulldown menu PD, according to operation received from the user, any speed in a range of 0% of the high speed to 100% of the high speed as the speed for operating the movable section A.

In the example shown in FIG. 6, a first property for designating the "high speed" as the speed for operating the movable section A is associated with the first first operation command C12 counted from the top in the region R2. That is, when the robot control device 40 operates the robot according to an operation program based on a work sequence displayed in the region R2, the robot 20 moves the movable section A at the "high speed" to the "work gripping position", thereafter grips the work with the hand, moves the work gripped by the hand to the "work releasing position" with the movable section A, and releases the work with the hand.

Figure 7:
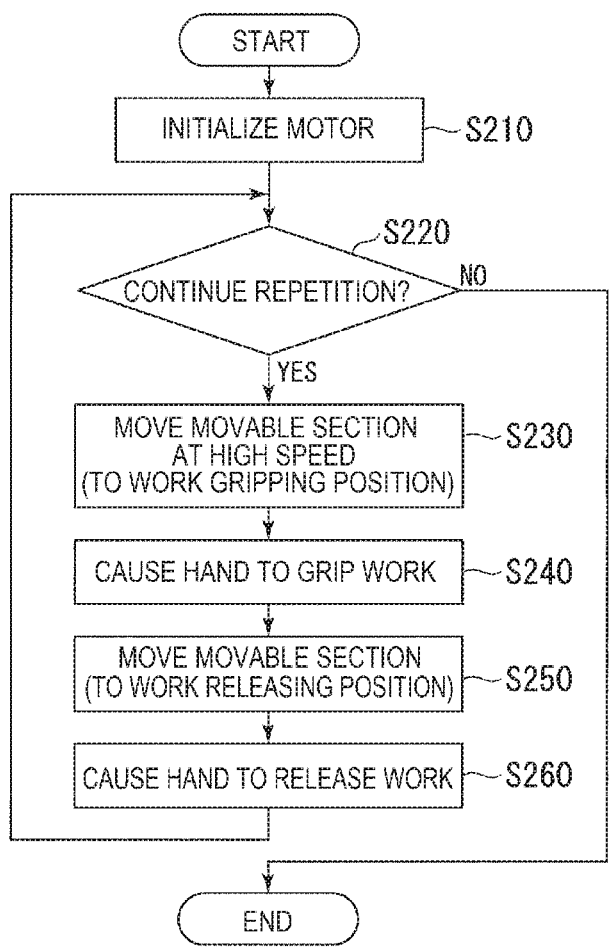
FIG. 7 is a diagram showing an example of a flow of processing of a robot control device that operates a robot according to an operation program based on a work sequence shown in FIG. 6.

More specifically, the robot control device 40 acquires the operation program based on the work sequence shown in FIG. 6 from the information processing device 50, performs processing of a flowchart of FIG. 7 based on the acquired operation program, and operates the robot 20. FIG. 7 is a diagram showing an example of a flow of the processing of the robot control device 40 that operates the robot 20 according to the operation program based on the work sequence shown in FIG. 6.

The robot control device 40 performs initialization of the respective first to fourth actuators included in the robot 20 (step S210). The processing of step S210 is processing performed by the robot control device 40 according to a first first operation command C11 counted from the top in the region R2 shown in FIG. 6.

Subsequently, the robot control device 40 determines whether repetition of processing of steps S230 to S260 is continued (step S220). The processing of step S220 is processing performed by the robot control device 40 according to the first logical structure command C41 counted from the top in the region R2 shown in FIG. 6. In step S220, the robot control device 40 determines whether a condition designated by the fourth property associated with the logical structure command C41 is satisfied to thereby determine whether the repetition of the processing of steps S230 to S260 is continued. When determining that the condition is not satisfied, the robot control device 40 determines that the repetition of the processing is not continued. On the other hand, when determining that the condition is satisfied, the robot control device 40 determines that the repetition of the processing is continued.

When determining that the repetition of the processing of steps S230 to S260 is not continued (NO in step S220), the robot control device 40 ends the processing.

On the other hand, when determining that the repetition of the processing of steps S230 to S260 is continued (YES in step S220), the robot control device 40 controls the robot 20 and moves the movable section A at the "high speed" to the "work gripping position" among predetermined positions (step S230). The processing of step S230 is processing performed by the robot control device 40 according to the first first operation command C12 counted from the top in the region R2 shown in FIG. 6.

Subsequently, the robot control device 40 controls the hand, moves the plurality of fingers of the hand in the direction in which the plurality of fingers move close to one another and closes the hand, and causes the hand to grip the work (step S240). The processing of step S240 is processing performed by the robot control device 40 according to the first second operation command C21 counted from the top in the region R2 shown in FIG. 6.

Subsequently, the robot control device 40 controls the robot 20 and moves the movable section A at the "low speed" to the "work releasing position" among the predetermined positions (step S250). The processing of step S250 is processing performed by the robot control device 40 according to the second first operation command C12 counted from the top in the region R2 shown in FIG. 6.

Subsequently, the robot control device 40 controls the hand, moves the plurality of fingers of the hand in the direction in which the plurality of fingers move away from one another and opens the hand, and causes the hand to release the work (step S260). The processing of step S260 is processing performed by the robot control device 40 according to the second second operation command C21 counted from the top in the region R2 shown in FIG. 6. After the processing of step S260 is performed, the robot control device 40 shifts to step S220 and determines again whether the repetition of the processing of steps S230 to S260 is continued.

In this way, the robot control device 40 acquires the operation program based on the work sequence shown in FIG. 6 from the information processing device 50, performs the processing of the flowchart of FIG. 7 based on the acquired operation program, and operates the robot 20.

However, when the robot control device 40 moves the movable section A to the "work gripping position" at the "high speed" according to the processing of step S230, the movable section A sometimes vibrates, because of braking by deceleration from the "high speed", in a position where the movable section A is about to stop. As a result, the movable section A sometimes interferes with another object. The other object is, for example, work or a stand on which the work is placed. That is, a display position relation in which the first operation command C12 for operating the movable section A at the "high speed" is located immediately before the second operation command C21 for operating the hand is an undesirable display position relation.

Therefore, display position relation information including eleventh display position relation information is stored in advance in the memory 52 of the information processing device 50. The eleventh display position relation information means information indicating an eleventh display position relation. The eleventh display position relation is, among the display position relations between the two or more commands arrayed as the work sequence in the region R2, a display position relation in which the first operation command C12 for operating the movable section A at the "high speed" is located immediately before the second operation command C21 for operating the hand. As shown in FIG. 6, when a relative display position relation between the first operation command C12 and the second operation command C21 arrayed as the work sequence in the region R2 and the eleventh display position relation indicated by the eleventh display position relation information stored in the memory 52 coincide, the display control section 561 causes the display section 55 to display attention calling information AT. In the example shown in FIG. 6, the attention calling information AT is displayed on the left side of the first operation command C12 arrayed in the region R2. A display position where the attention calling information AT is displayed may be another display position on the display section 55 instead of the display position. However, the display position where the attention calling information AT is displayed is desirably a display position capable of indicating a display position of one or both of the first operation command C12 and the second operation command C21 in the region R2. Consequently, the user can easily specify one or both of two commands that are in an undesirable display position relation. The eleventh display position relation is an example of the first display position relation. The eleventh display position relation information is an example of the first display position relation information. The second operation command C21 is an example of the first command. The first operation command C12 is an example of the second command.

The eleventh display position relation information may be information indicating a display position relation in which the first operation command C12 for moving the movable section A faster than predetermined speed is located immediately before the second operation command C21 instead of the information indicating the display position relation in which the first operation command C12 for operating the movable section A at the "high speed" is located immediately before the second operation command C21 for operating the hand. The predetermined speed may be speed desired by the user or may be speed determined by some other reasons.

The eleventh display position relation information may be information indicating a display position relation in which the first operation command C12 for moving the movable section A at predetermined "custom speed" is located immediately before the second operation command C21 instead of the information indicating the display position relation in which the first operation command C12 for operating the movable section A at the "high speed" is located immediately before the second operation command C21 for operating the hand.

In this embodiment, even when a certain command X1, another command X2, and one or more some processing commands X3 are arranged in the order of the command X1, the one or more processing commands X3, and the command X2, it is understood that the command X1 is located immediately before the command X in a relative display position relation between the command X1 and the command X2. This is because processing commands do not operate the movable section A and the external devices. In other words, in this embodiment, when a command X4 different from a command for changing one or both of the position of the robot 20 and the posture of the robot 20 is located between a display position of the command X and a display position of the command X2 on the work sequence, for example, even if the command X1, the command X2, and the command X4 are displayed side by side in the order of the command X1, the command X4, and the command X2, it is understood that the command X1 is located immediately before the command X2 ignoring the presence of the command X4 and it is understood that the command X2 is located immediately after the command X1 ignoring the presence of the command X4. Therefore, in this embodiment, a display position relation between two or more commands displayed on a certain image means a display position relation of two or more operation commands or means a display position relation between two or more commands including both of an operation command and a logical structure command.

Although the attention calling information AT shown in FIG. 6 is the image, instead of the image, the attention calling information AT may be represented by changing, among the plurality of commands arrayed in the region R2, display forms of respective two or more commands that are in an undesirable display position relation. The display form means a color, brightness, and the like. Although the attention calling information AT shown in FIG. 6 is the image, instead of the image, the attention calling information AT may be a message for urging correction of a display position relation among respective two or more commands that are in an undesirable display position relation among the plurality of commands arrayed in the region R2.

A Specific Example 2 of the Undesirable Display Position Relation and a Display Example 2 of the Attention Calling Information A specific example 2 of the undesirable display position relation among the display position relations among the plurality of commands arrayed as the work sequence and a display example 2 of the attention calling information are explained below with reference to FIG. 8.

Figure 8:
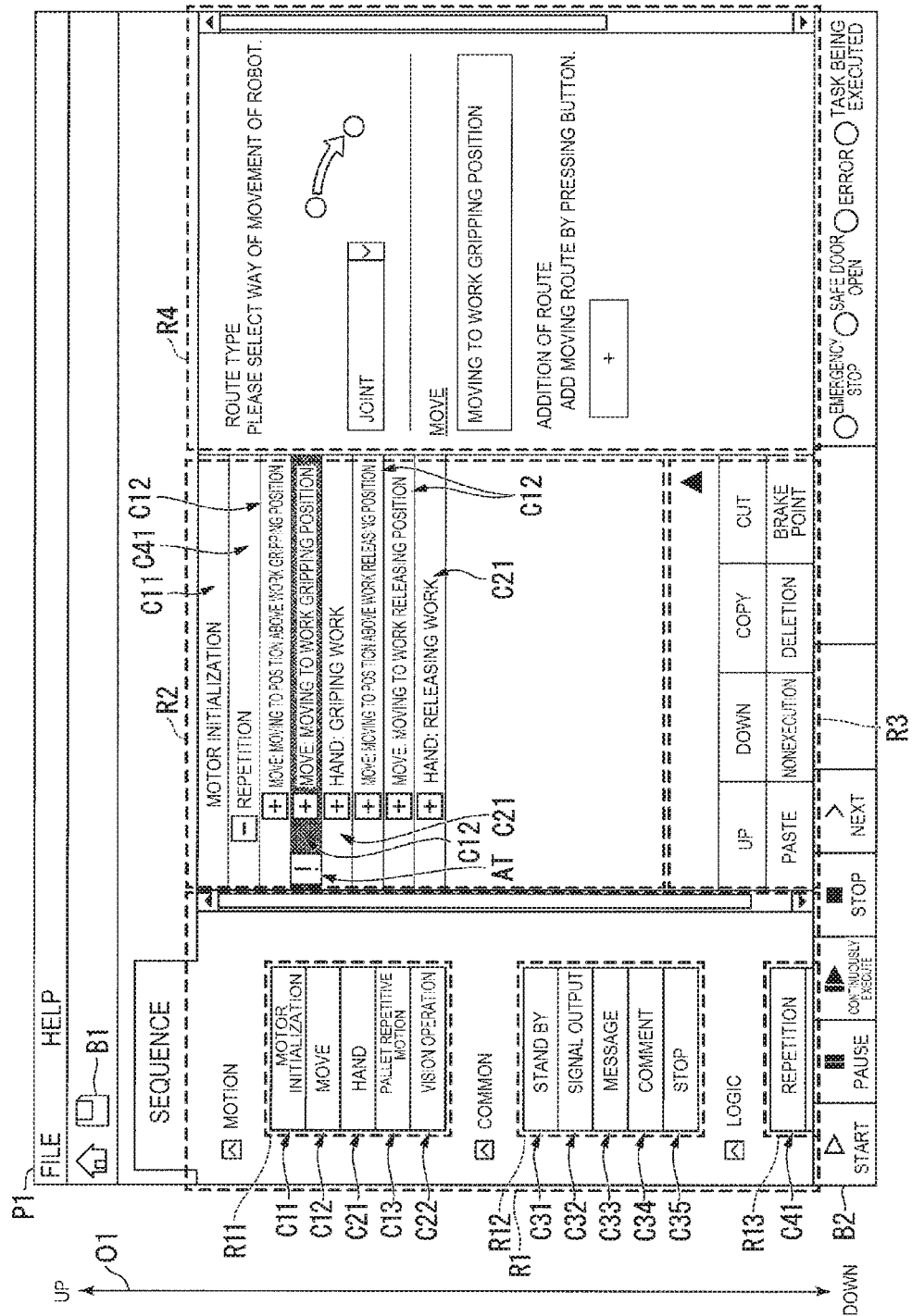
FIG. 8 is a diagram showing another example of the image displayed when the attention calling information is displayed.

FIG. 8 is a diagram showing another example of the image P1 displayed when the attention calling information is displayed. In the example shown in FIG. 8, eight commands, that is, the first operation command C11, the logical structure command C41, the first operation command C12, the first operation command C12, the second operation command C21, the first operation command C12, the first operation command C12, and the second operation command C21 are arrayed in order from the top to the bottom in the region R2. In this example, properties are associated with respective four first operation commands C12, respective two second operation command C21, and one logical structure command C41. However, in this example, these properties are folded and are not displayed in the region R2. In this example, a second first operation command C12 counted from the top is selected by the user in the region R2. Therefore, in the region R4, images for editing contents of respective three first properties associated with the first operation command C12 are displayed. As shown in FIG. 8, the three first properties are respectively a first property for designating a moving destination of the movable section A, a first property for designating the speed for operating the movable section A, and a first property for designating the method of the operation of the movable section A. In the region R4 shown in FIG. 8, the image for editing the first property for designating the speed for operating the movable section A is slid downward by scroll in the region R4 and is hidden.

In the example shown in FIG. 8, a fourth property for designating a condition for repeatedly executing target processing is associated with a first logical structure command C41 counted from the top in the region R2. However, as explained above, in this example, the fourth property is folded and is hidden in the region R2.

In the example shown in FIG. 8, in the region R2, commands repeatedly executed by the logical structure command C41, that is, the respective four first operation commands C12 and the respective two second operation commands C21 are displayed as low order nodes together with the logical structure command C41. Display positions where the six commands are displayed as the low order nodes of the logical structure command C41 among the display positions in the region R2 are examples of the associated display positions associated with the logical structure command C41. The associated display positions are display positions where the commands serving as the low order nodes of the logical structure command C41 are located among the display positions in the region R2.

In the example shown in FIG. 8, a first first operation command C12 counted from the top in the region R2 is shown as "move: moving to a position above the work gripping position". This indicates that, in FIG. 8, a first property for designating the "position above the work gripping position" as the moving destination of the movable section A is associated with the first operation command C12. However, as explained above, in this example, the first property is folded and is hidden in the region R2. In the following explanation, as an example, the "position above the work releasing position" is a position indicated by a coordinate (100, 200, −50) in the robot coordinate system RC of the robot 20. Although not shown in the region R2, in the following explanation, as an example, a first property for designating the "high speed" as the speed for operating the movable section A is associated with the first operation command C12. Although not shown in the region R2, in the following explanation, as an example, a first property for designating the "method of operation by control for minimizing turning angles of joints of the movable section A" as the method of the operation of the movable section A is associated with the first operation command C12.

In the example shown in FIG. 8, the second first operation command C12 counted from the top in the region R2 is shown as "move: moving to a work gripping position". This indicates that, in FIG. 8, a first property for designating the "work gripping position" as the moving destination of the movable section A is associated with the first operation command C12. However, as explained above, in this example, the first property is folded and is hidden in the region R2. In the following explanation, as an example, the "work releasing position" is a position indicated by a coordinate (50, 200, −200) in the robot coordinate system RC of the robot 20. Although not shown in the region R2, in the following explanation, as an example, a first property for designating the "low speed" as the speed for operating the movable section A is associated with the first operation command C12. Although not shown in the region R2, in the following explanation, as an example, a first property for designating the "method of operation by control for minimizing turning angles of joints of the movable sections A" as the method of the operation of the movable section A is associated with the first operation command C12.

In the example shown in FIG. 8, a first second operation command C21 counted from the top in the region R2 is shown as "hand: gripping work". This indicates that, in FIG. 8, a second property for designating "moving the plurality of fingers of the hand in the direction in which the plurality of fingers move close to one another and closing the hand" as the operation of the hand is associated with the second operation command C21. However, as explained above, in this example, the second property is folded and is hidden in the region R2.

In the example shown in FIG. 8, a third first operation command C12 counted from the top in the region R2 is shown as "move: moving to a position above the work releasing position". This indicates that, in FIG. 8, a first property for designating the "position above the work releasing position" as the moving destination of the movable section A is associated with the first operation command C12. However, as explained above, in this example, the first property is folded and is hidden in the region R2. In the following explanation, as an example, the "position above the work releasing position" is a position indicated by a coordinate (−200, 200, −50) in the robot coordinate system RC of the robot 20. Although not shown, in the following explanation, as an example, a first property for designating the "high speed" as the speed for operating the movable section A is associated with the first operation command C12. Although not shown in the region R2, in the following explanation, as an example, a first property for designating the "method of operation by control for minimizing turning angles of joints of the movable section A" as the method of the operation of the movable section A is associated with the first operation command C12.

In the example shown in FIG. 8, the third first operation command C12 counted from the top in the region R2 is shown as "move: moving to a work releasing position". This indicates that, in FIG. 8, a first property for designating the "work releasing position" as the moving destination of the movable section A is associated with the first operation command C12. However, as explained above, in this example, the first property is folded and is hidden in the region R2. In the following explanation, as an example, the "work releasing position" is a position indicated by a coordinate (−200, 200, −200) in the robot coordinate system RC of the robot 20. Although not shown in FIG. 8, in the following explanation, as an example, a first property for designating the "low speed" as the speed for operating the movable section A is associated with the first operation command C12. Although not shown in the region R2, in the following explanation, as an example, a first property for designating the "method of operation by control for minimizing turning angles of joints of the movable section A" as the method of the operation of the movable section A is associated with the first operation command C12.

In the example shown in FIG. 8, a second second operation command C21 counted from the top in the region R2 is shown as "hand: releasing work". This indicates that, in FIG. 8, a second property for designating "moving the plurality of fingers of the hand in the direction in which the plurality of fingers move away from one another and opening the hand" as the operation of the hand is associated with the second operation command C21. However, as explained above, in this example, the second property is folded and is hidden in the region R2.

In the example shown in FIG. 8, the region R4 includes, as GUIs, the pulldown menu SR, the input field IR, the pulldown menu PD hidden blow the figure by scroll in FIG. 8, and the slide bar SB hidden blow the figure by scroll in FIG. 8.

In the example shown in FIG. 8, "joint" is displayed in the pulldown menu SR. In this example, the "joint" indicates the "method of operation by control for minimizing turning angles of joints of the movable section A" among a plurality of methods of operation predetermined as the method of operation of the movable section A. That is, in this example, in the pulldown menu SR, the "method of operation by control for minimizing turning angles of joints of the movable section A" is selected as the method of the operation of the movable section A.

In the example shown in FIG. 8, "moving to a work gripping position" is input to the input field IR as information indicating the moving destination of the movable section A.

Although hidden in the example shown in FIG. 8, the "low speed" is displayed in the pulldown menu PD. That is, in this example, the "low speed" is selected as the speed for operating the movable section A.

In the example shown in FIG. 8, a first property for designating, as the moving destination of the movable section A, the position indicated by the coordinate (100, 200, −50) in the robot coordinate system RC of the robot 20 is associated with the first first operation command C12 counted from the top in the region R2. In this example, a first property for designating, as the moving destination of the movable section A, the position indicated by the coordinate (50, 200, −200) in the robot coordinate system RC of the robot 20 is associated with the second first operation command C12 counted from the top in the region R2. In this example, a first property for designating, as the moving destination of the movable section A, the position indicated by the coordinate (−200, 200, −50) in the robot coordinate system RC of the robot 20 is associated with the third first operation command C12 counted from the top in the region R2. In this example, a first property for designating, as the moving destination of the movable section A, the position indicated by the coordinate (−200, 200, −200) in the robot coordinate system RC of the robot 20 is associated with a fourth first operation command C12 counted from the top in the region R2.

That is, when the robot 20 is operated according to the operation program based on the work sequence displayed in the region R2 shown in FIG. 8, the robot 20 moves the movable section A to the "position above the work gripping position" at the "high speed", thereafter moves the movable section A to the "work gripping position" at the "low speed", grips the work with the hand, moves the work gripped by the hand to the "position above the work releasing position" with the movable section A, thereafter moves the movable section A to the "work releasing position" at the "low speed", and releases the work with the hand. Therefore, in this case, the robot 20 moves the movable section A in a direction different from respective positive and negative directions of the Z axis in the robot coordinate system RC immediately before gripping the work. In the following explanation, for convenience of explanation, the positive direction is referred to as eleventh direction, the negative direction is referred to as twelfth direction, and the direction is referred to as thirteenth direction.

Figure 9:
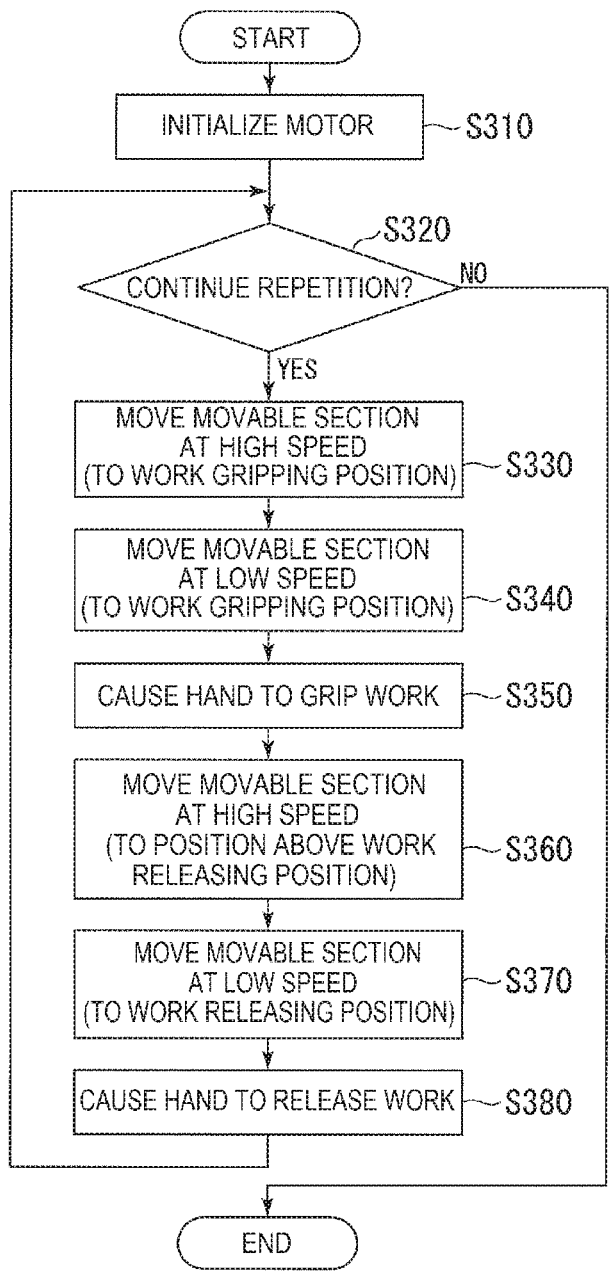
FIG. 9 is a diagram showing an example of a flow of processing of the robot control device that operates the robot according to an operation program based on a work sequence shown in FIG. 8.

More specifically, the robot control device 40 acquires the operation program based on the work sequence shown in FIG. 8 from the information processing device 50, performs processing of a flowchart of FIG. 9, and operates the robot 20. FIG. 9 is a diagram showing an example of a flow of processing of the robot control device 40 that operates the robot 20 according to the operation program based on the work sequence shown in FIG. 8.

The robot control device 40 performs initialization of the respective first to fourth actuators included in the robot 20 (step S310). The processing of step S310 is processing performed by the robot control device 40 according to a first first operation command C11 counted from the top in the region R2 shown in FIG. 8.

The robot control device 40 determines whether repetition of processing of steps S330 to S380 is continued (step S320). The processing of step S320 is processing performed by the robot control device 40 according to the first logical structure command C41 counted from the top in the region R2 shown in FIG. 8. In step S320, the robot control device 40 determines whether a condition designated by the fourth property associated with the logical structure command C41 is satisfied to thereby determine whether the repetition of the processing of steps S330 to S380 is continued. When determining that the condition is not satisfied, the robot control device 40 determines that the repetition of the processing is not continued. On the other hand, when determining that the condition is satisfied, the robot control device 40 determines that the repetition of the processing is continued.

When determining that the repetition of the processing of steps S330 to S380 is not continued (NO in step S320), the robot control device 40 ends the processing.

On the other hand, when determining that the repetition of the processing of steps S330 to S380 is continued (YES in step S320), the robot control device 40 controls the robot 20 and moves the movable section A at the high speed to the "position above the work gripping position" shown in FIG. 8 among the predetermined positions (step S330). The processing of step S330 is processing performed by the robot control device 40 according to the first first operation command C12 counted from the top in the region R2 shown in FIG. 8.

Subsequently, the robot control device 40 controls the robot 20 and moves the movable section A at the "low speed" to the "work gripping position" shown in FIG. 8 among the predetermined positions (step S340). The processing of step S340 is processing performed by the robot control device 40 according to the second first operation command C12 counted from the top in the region R2 shown in FIG. 8.

Subsequently, the robot control device 40 controls the hand, moves the plurality of fingers of the hand in the direction in which the plurality of fingers move close to one another and closes the hand, and causes the hand to grip the work (step S350). The processing of step S350 is processing performed by the robot control device 40 according to the first second operation command C21 counted from the top in the region R2 shown in FIG. 8.

Subsequently, the robot control device 40 controls the robot 20 and moves the movable section A at the "high speed" to the "position above the work releasing position" among the predetermined positions (step S360). The processing of step S360 is processing performed by the robot control device 40 according to the third first operation command C12 counted from the top in the region R2 shown in FIG. 8.

Subsequently, the robot control device 40 controls the robot 20 and moves the movable section A at the "low speed" to the "work releasing position" among the predetermined positions (step S370). The processing of step S370 is processing performed by the robot control device 40 according to the fourth first operation command C12 counted from the top in the region R2 shown in FIG. 8.

Subsequently, the robot control device 40 controls the hand, moves the plurality of fingers of the hand in the direction in which the plurality of fingers move away from one another and opens the hand, and causes the hand to release the work (step S380). The processing of step S380 is processing performed by the robot control device 40 according to the second second operation command C21 counted from the top in the region R2 shown in FIG. 8. After the processing of step S380 is performed, the robot control device 40 shifts to step S320 and determines again whether the repetition of the processing of steps S330 to S380 is continued.

In this way, the robot control device 40 acquires the operation program based on the work sequence shown in FIG. 8 from the information processing device 50, performs the processing of the flowchart of FIG. 9 based on the acquired operation program, and operates the robot 20.

After moving the movable section A to the "position above the work gripping position" at the high speed according to the processing of step S330, the robot control device 40 moves the movable section A to the "work gripping position" at the "high speed" according to the processing of step S340. The "position above the work gripping position" is the position indicated by the coordinate (100, 200, −50) in the robot coordinate system RC. The "work gripping position" is the position indicated by the coordinate (50, 200, −200) in the robot coordinate system RC. That is, the movable section A moves in the thirteenth direction different from the respective eleventh and twelfth directions immediately before the hand grips the work. In this case, the movable section A vibrates in the twelfth direction. As a result, the robot 20 sometimes cannot accurately grip the work with the hand. The robot 20 is likely to drop the work gripped by the hand because of the vibration. That is, a display position relation in which the first operation command C12 for operating the movable section A toward the thirteenth direction different from the respective eleventh and twelfth directions is located immediately before the second operation command C21 for operating the hand is an undesirable display position relation.

Therefore, display position relation information including twelfth display position relation information is stored in advance in the memory 52 of the information processing device 50. The twelfth display position relation information means information indicating a twelfth display position relation. The twelfth display position relation is, among the display position relations between the two or more commands arrayed as the work sequence in the region R2, a display position relation in which the first operation command C12 for operating the movable section A toward the second direction is located immediately before the second operation command C21 for operating the hand. As shown in FIG. 8, when a display position relation between the first operation command C12 and the second operation command C21 arrayed as the work sequence in the region R2 and the twelfth display position relation indicated by the twelfth display position relation information stored in the memory 52 coincide, the display control section 561 causes the display section 55 to display the attention calling information AT. In the example shown in FIG. 8, the attention calling information AT is displayed on the left side of the first operation command C12 arrayed in the region R2. A display position where the attention calling information AT is displayed may be another display position on the display section 55 instead of the display position. However, the display position where the attention calling information AT is displayed is desirably a display position capable of indicating a display position of one or both of the first operation command C12 and the second operation command C21 in the region R2. Consequently, the user can easily specify one or both of two commands that are in an undesirable display position relation. The twelfth display position relation is an example of the first display position relation. The twelfth display position relation information is an example of the first display position relation information. The second operation command C21 is an example of the first command. The first operation command C12 is an example of the second command. When the work is placed on a shelf or the like, the eleventh direction may be a direction other than the respective positive and negative directions of the Z axis in the robot coordinate system RC. The eleventh direction is an example of the first direction separating from the setting surface of the robot and is an example of the second direction. The twelfth direction is an example of the first direction approaching the setting surface of the robot and is an example of a direction opposite to the second direction. The thirteenth direction is an example of the third direction.

A Specific Example 3 of the Undesirable Display Position Relation and a Display Example 3 of the Attention Calling Information A specific example 3 of the undesirable display position relation among the display position relations among the plurality of commands arrayed as the work sequence and a display example 3 of the attention calling information are explained below with reference to FIG. 10.

Figure 10:
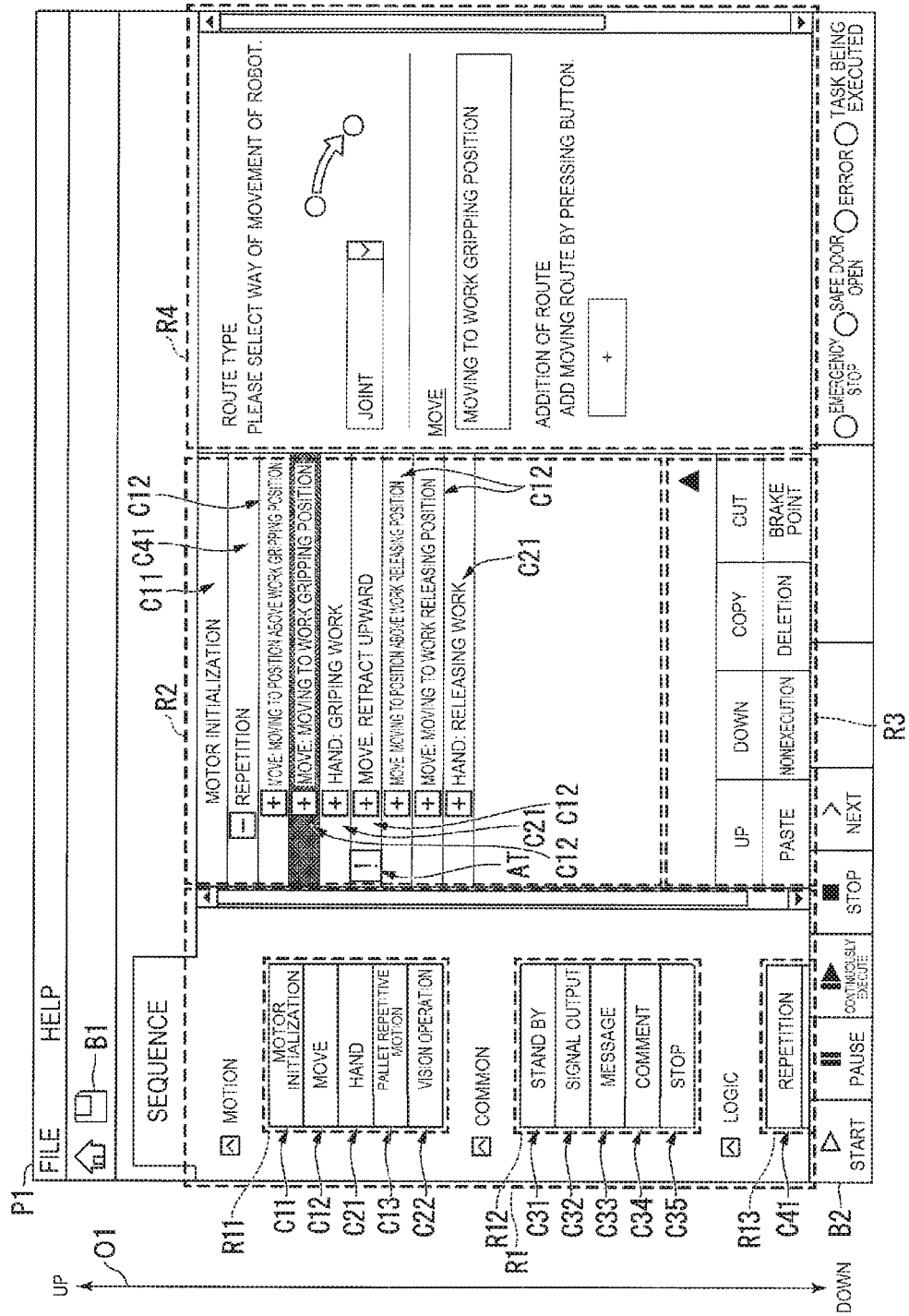
FIG. 10 is a diagram showing still another example of the image displayed when the attention calling information is displayed.

FIG. 10 is a diagram showing another example of the image P1 displayed when the attention calling information is displayed. In the example shown in FIG. 10, nine commands, that is, the first operation command C11, the logical structure command C41, the first operation command C12, the first operation command C12, the second operation command C21, the first operation command C12, the first operation command C12, the first operation command C12, and the second operation command C21 are arrayed in order from the top to the bottom in the region R2. In this example, properties are associated with respective five first operation commands C12, respective two second operation command C21, and one logical structure command C41. However, in this example, these properties are folded and are not displayed in the region R2. In this example, a second first operation command C12 counted from the top is selected by the user in the region R2. Therefore, in the region R4, images for editing contents of respective three first properties associated with the first operation command C12 are displayed. As shown in FIG. 10, the three first properties are respectively a first property for designating a moving destination of the movable section A, a first property for designating the speed for operating the movable section A, and a first property for designating the method of the operation of the movable section A. In the region R4 shown in FIG. 10, the image for editing the first property for designating the speed for operating the movable section A is slid downward by scroll in the region R4 and is hidden.

In the example shown in FIG. 10, a fourth property for designating a condition for repeatedly executing target processing is associated with a first logical structure command C41 counted from the top in the region R2. However, as explained above, in this example, the fourth property is folded and is hidden in the region R2.

In the example shown in FIG. 10, in the region R2, commands repeatedly executed by the logical structure command C41, that is, the respective five first operation commands C12 and the respective two second operation commands C21 are displayed as low order nodes together with the logical structure command C41. Display positions where these seven commands are displayed as the low order nodes of the logical structure command C41 among the display positions in the region R2 are examples of the associated display positions associated with the logical structure command C41. The associated display positions are display positions where the commands serving as the low order nodes of the logical structure command C41 are located among the display positions in the region R2.

In the example shown in FIG. 10, a first first operation command C12 counted from the top in the region R2 is shown as "move: moving to a position above the work gripping position". This indicates that, in FIG. 10, a first property for designating the "position above the work gripping position" as the moving destination of the movable section A is associated with the first operation command C12. However, as explained above, in this example, the first property is folded and is hidden in the region R2. In FIG. 10, as an example, the "position above the work gripping position" is the position indicated by the coordinate (100, 200, −50) in the robot coordinate system RC of the robot 20. Although not shown in the region R2 shown in FIG. 10, in the following explanation, as an example, a first property for designating the "high speed" as the speed for operating the movable section A is associated with the first operation command C12. Although not shown in the region R2, in the following explanation, as an example, a first property for designating the "method of operation by control for minimizing turning angles of joints of the movable section A" as the method of the operation of the movable section A is associated with the first operation command C12.

In the example shown in FIG. 10, the second first operation command C12 counted from the top in the region R2 is shown as "move: moving to a work gripping position". This indicates that, in FIG. 10, a first property for designating the "work gripping position" as the moving destination of the movable section A is associated with the first operation command C12. However, as explained above, in this example, the first property is folded and is hidden in the region R2. In the following explanation, as an indicated by a coordinate (100, 200, −200) in the robot coordinate system RC of the robot 20. Although not shown in the region R2, in the following explanation, as an example, a first property for designating the "low speed" as the speed for operating the movable section A is associated with the first operation command C12. Although not shown in the region R2, in the following explanation, as an example, a first property for designating the "method of operation by control for minimizing turning angles of joints of the movable sections A" as the method of the operation of the movable section A is associated with the first operation command C12.

In the example shown in FIG. 10, a first second operation command C21 counted from the top in the region R2 is shown as "hand: gripping work". This indicates that, in FIG. 10, a second property for designating "moving the plurality of fingers of the hand in the direction in which the plurality of fingers move close to one another and closing the hand" as the operation of the hand is associated with the second operation command C21. However, as explained above, in this example, the second property is folded and is hidden in the region R2.

In the example shown in FIG. 10, a third first operation command C12 counted from the top in the region R2 is shown as "move: retracting upward". This indicates that, in FIG. 10, a first property for designating an "upward position" as the moving destination of the movable section A is associated with the first operation command C12. However, as explained above, in this example, the first property is folded and is hidden in the region R2. In the following explanation, as an example, the "upward position" is a position indicated by a coordinate (−150, 200, −50) in the robot coordinate system RC of the robot 20. Although not shown in FIG. 10, in the following explanation, as an example, a first property for designating the "high speed" as the speed for operating the movable section A is associated with the first operation command C12. Although not shown in the region R2 shown in FIG. 10, in the following explanation, as an example, a first property for designating the "method of operation by control for minimizing turning angles of joints of the movable section A" as the method of the operation of the movable section A is associated with the first operation command C12.

In the example shown in FIG. 10, a fourth first operation command C12 counted from the top in the region R2 is shown as "move: moving to a position above the work releasing position". This indicates that, in FIG. 10, a first property for designating the "position above the work releasing position" as the moving destination of the movable section A is associated with the first operation command C12. However, as explained above, in this example, the first property is folded and is hidden in the region R2. In the following explanation, as an example, the "position above the work releasing position" is the position indicated by the coordinate (−200, 200, −50) in the robot coordinate system RC in the region R2. Although not shown in the region R2, in the following explanation, as an example, a first property for designating the "low speed" as the speed for operating the movable section A is associated with the first operation command C12. Although not shown in the region R2, in the following explanation, as an example, a first property for designating the "method of operation by control for minimizing turning angles of joints of the movable section A" as the method of the operation of the movable section A is associated with the first operation command C12.

In the example shown in FIG. 10, the fifth first operation command C12 counted from the top in the region R2 is shown as "move: moving to a work releasing position". This indicates that, in FIG. 10, a first property for designating the "work releasing position" as the moving destination of the movable section A is associated with the first operation command C12. However, as explained above, in this example, the first property is folded and is hidden in the region R2. In the following explanation, as an example, the "work releasing position" is the position indicated by the coordinate (−200, 200, −200) in the robot coordinate system RC of the robot 20. Although not shown in FIG. 10, in the following explanation, as an example, a first property for designating the "low speed" as the speed for operating the movable section A is associated with the first operation command C12. Although not shown in the region R2 shown in FIG. 10, in the following explanation, as an example, a first property for designating the "method of operation by control for minimizing turning angles of joints of the movable section A" as the method of the operation of the movable section A is associated with the first operation command C12.

In the example shown in FIG. 10, a second second operation command C21 counted from the top in the region R2 is shown as "hand: releasing work". This indicates that, in FIG. 10, a second property for designating "moving the plurality of fingers of the hand in the direction in which the plurality of fingers move away from one another and opening the hand" as the operation of the hand is associated with the second operation command C21. However, as explained above, in this example, the second property is folded and is hidden in the region R2.

In the example shown in FIG. 10, the region R4 includes, as GUIs, the pulldown menu SR, the input field IR, the pulldown menu PD hidden below the figure by scroll in FIG. 10, and the slide bar SB hidden below the figure by scroll in FIG. 10. The region R4 shown in FIG. 10 has the same configuration as the region R4 shown in FIG. 8. Therefore, explanation of the region R4 is omitted.

In the example shown in FIG. 10, a first property for designating, as the moving destination of the movable section A, the position indicated by the coordinate (100, 200, −50) in the robot coordinate system RC of the robot 20 is associated with the first first operation command C12 counted from the top in the region R2. In this example, a first property for designating, as the moving destination of the movable section A, the position indicated by the coordinate (100, 200, −200) in the robot coordinate system RC of the robot 20 is associated with the second first operation command C12 counted from the top in the region R2. In this example, a first property for designating, as the moving destination of the movable section A, the position indicated by the coordinate (−150, 200, −50) in the robot coordinate system RC of the robot 20 is associated with the third first operation command C12 counted from the top in the region R2. In this example, a first property for designating, as the moving destination of the movable section A, the position indicated by the coordinate (−200, 200, −50) in the robot coordinate system RC of the robot 20 is associated with the fourth first operation command C12 counted from the top in the region R2. In this example, a first property for designating, as the moving destination of the movable section A, the position indicated by the coordinate (−200, 200, −200) in the robot coordinate system RC of the robot 20 is associated with a fifth first operation command C12 counted from the top in the region R2.

That is, when the robot 20 is operated according to the operation program based on the work sequence displayed in the region R2 shown in FIG. 10, the robot 20 moves the movable section A to the "position above the work gripping position" at the "high speed", thereafter moves the movable section A to the "work gripping position" at the "low speed", grips the work with the hand, and moves the work gripped by the hand to the "upward position" at the "high speed" with the movable section A. The robot 20 moves the movable section A to the "position above the work releasing position" at the "high speed", thereafter moves the movable section A to the "work releasing position" at the "low speed", and releases the work with the hand. Therefore, in this case, a direction in which the movable section A moves immediately before the work is gripped does not coincide with the opposite direction of a direction in which the movable section A moves immediately after the work is gripped.

Figure 11:
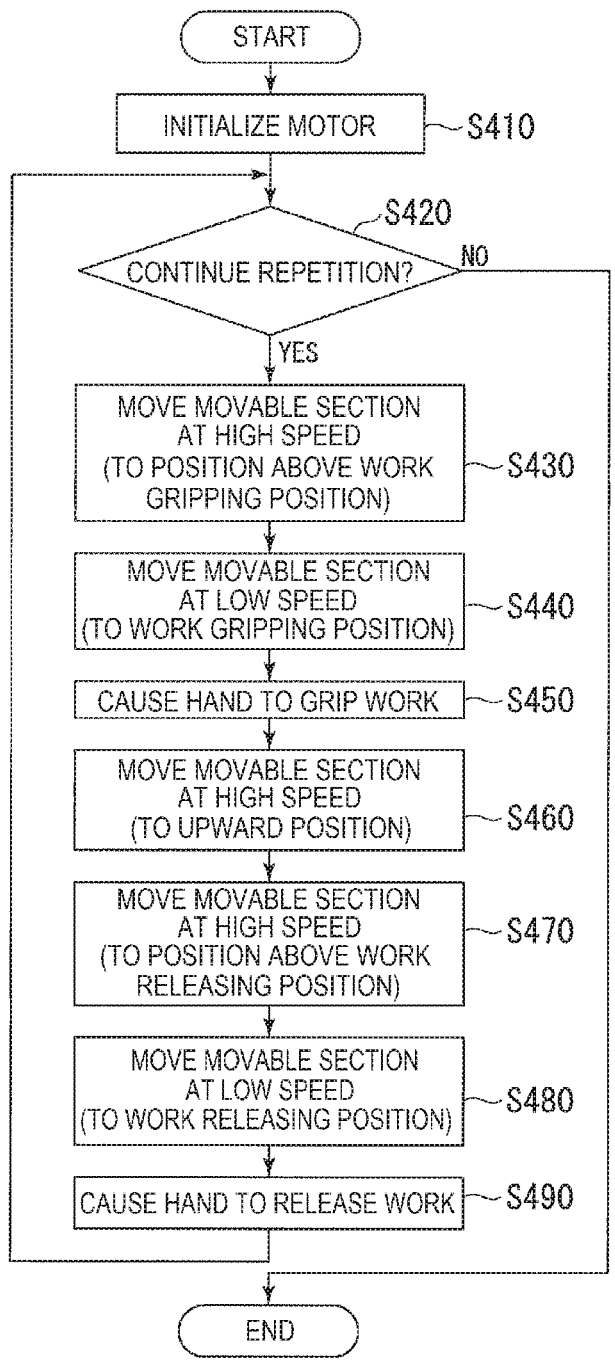
FIG. 11 is a diagram showing an example of a flow of processing of the robot control device that operates the robot according to an operation program based on a work sequence shown in FIG. 10.

More specifically, the robot control device 40 acquires the operation program based on the work sequence shown in FIG. 10 from the information processing device 50, performs processing of a flowchart of FIG. 11, and operates the robot 20. FIG. 11 is a diagram showing an example of a flow of processing of the robot control device 40 that operates the robot 20 according to the operation program based on the work sequence shown in FIG. 10.

The robot control device 40 performs initialization of the respective first to fourth actuators included in the robot 20 (step S410). The processing of step S410 is processing performed by the robot control device 40 according to a first first operation command C11 counted from the top in the region R2 shown in FIG. 10.

The robot control device 40 determines whether repetition of processing of steps S430 to S490 is continued (step S420). The processing of step S420 is processing performed by the robot control device 40 according to the first logical structure command C41 counted from the top in the region R2 shown in FIG. 10. In step S420, the robot control device 40 determines whether a condition designated by the fourth property associated with the logical structure command C41 is satisfied to thereby determine whether the repetition of the processing of steps S430 to S490 is continued. When determining that the condition is not satisfied, the robot control device 40 determines that the repetition of the processing is not continued. On the other hand, when determining that the condition is satisfied, the robot control device 40 determines that the repetition of the processing is continued.

When determining that the repetition of the processing of steps S430 to S490 is not continued (NO in step S420), the robot control device 40 ends the processing.

On the other hand, when determining that the repetition of the processing of steps S430 to S490 is continued (YES in step S420), the robot control device 40 controls the robot 20 and moves the movable section A at the high speed to the "position above the work gripping position" shown in FIG. 10 among the predetermined positions (step S430). The processing of step S430 is processing performed by the robot control device 40 according to the first first operation command C12 counted from the top in the region R2 shown in FIG. 10.

Subsequently, the robot control device 40 controls the robot 20 and moves the movable section A at the "low speed" to the "work gripping position" shown in FIG. 10 among the predetermined positions (step S440). The processing of step S440 is processing performed by the robot control device 40 according to the second first operation command C12 counted from the top in the region R2 shown in FIG. 10.

Subsequently, the robot control device 40 controls the hand, moves the plurality of fingers of the hand in the direction in which the plurality of fingers move close to one another and closes the hand, and causes the hand to grip the work (step S450). The processing of step S450 is processing performed by the robot control device 40 according to the first second operation command C21 counted from the top in the region R2 shown in FIG. 10.

Subsequently, the robot control device 40 controls the robot 20 and moves the movable section A at the "high speed" to the "upward position" among the predetermined positions (step S460). The processing of step S460 is processing performed by the robot control device 40 according to the third first operation command C12 counted from the top in the region R2 shown in FIG. 10.

Subsequently, the robot control device 40 controls the robot 20 and moves the movable section A at the "high speed" to the "position above the work releasing position" among the predetermined positions (step S470). The processing of step S470 is processing performed by the robot control device 40 according to the fourth first operation command C12 counted from the top in the region R2 shown in FIG. 10.

Subsequently, the robot control device 40 controls the robot 20 and moves the movable section A at the "low speed" to the "work releasing position" among the predetermined positions (step S480). The processing of step S480 is processing performed by the robot control device 40 according to the fifth first operation command C12 counted from the top in the region R2 shown in FIG. 10.

Subsequently, the robot control device 40 controls the hand, moves the plurality of fingers of the hand in the direction in which the plurality of fingers move away from one another and opens the hand, and causes the hand to release the work (step S490). The processing of step S490 is processing performed by the robot control device 40 according to the second second operation command C21 counted from the top in the region R2 shown in FIG. 10. After the processing of step S490 is performed, the robot control device 40 shifts to step S420 and determines again whether the repetition of the processing of steps S430 to S490 is continued.

In this way, the robot control device 40 acquires the operation program based on the work sequence shown in FIG. 10 from the information processing device 50, performs the processing of the flowchart of FIG. 11 based on the acquired operation program, and operates the robot 20.

After moving the movable section A to the "work gripping position" at the "high speed" according to the processing of step S440, the robot control device 40 moves the movable section A to the "upward position" at the "high speed" according to the processing of step S460. In the processing of step S440, the movable section A moves in the twelfth direction from the coordinate (100, 200, −50) in the robot coordinate system RC to the coordinate (100, 200, −200) in the robot coordinate system RC. In the processing of step S460, the movable section A moves in the eleventh direction from the coordinate (100, 200, −200) in the robot coordinate system RC to the coordinate (−150, 200, −50) in the robot coordinate system RC. In this way, when a direction in which the movable section A moves immediately after the hand grips the work does not coincide with an opposite direction of a direction in which the movable section A moves immediately before the hand grips the work, the robot 20 is likely to interfere with another object. This is because it is likely that the direction in which the movable section A moves immediately before the hand grips the work is a direction in which the robot 20 does not interfere with another object. That is, a display position relation in which the first operation command C12 for operating the movable section A toward a certain direction immediately before the hand grips the work is located immediately before the second operation command C21 for operating the hand and in which the first operation command C12 for operating the movable section A in a direction different from the direction immediately after the hand grips the work is located immediately after the second operation command C21 is an undesirable display position relation.

Therefore, display position relation information including second display position relation information is stored in advance in the memory 52 of the information processing device 50. The second display position relation information means information indicating a second display position relation. The second display position relation is, among the display position relations between the two or more commands arrayed as the work sequence in the region R2, a display position relation in which the first operation command C12 for operating the movable section A toward a certain direction immediately before the hand grips the work is located immediately before the second operation command C21 for operating the hand and is a display position relation in which the first operation command C12 for operating the movable section A in a direction different from the direction immediately after the hand grips the work is located immediately after the second operation command C21. As shown in FIG. 10, when a display position relation between the two first operation commands C12 and the second operation command C21 arrayed as the work sequence in the region R2 and the second display position relation indicated by the second display position relation information stored in the memory 52 coincide, the display control section 561 causes the display section 55 to display the attention calling information AT. In the example shown in FIG. 10, the attention calling information AT is displayed on the left side of the third first operation command C12 counted from the top in the region R2. A display position where the attention calling information AT is displayed may be another display position on the display section 55 instead of the display position. However, the display position where the attention calling information AT is displayed is desirably a display position capable of indicating a display position of any one of the first operation command C12 for operating the movable section A in a certain direction immediately before the hand grips the work, the first operation command C12 for operating the movable section A in a direction different from the direction immediately after the hand grips the work, and the second operation command C21. Consequently, the user can easily specify and quickly specify any one of three commands that are in an undesirable display position relation. The second operation command C21 is an example of the first command. The first operation command C12 for operating the movable section A in a certain direction before the hand grips the work is an example of the second command. The first operation command C12 for operating the movable section A in a direction different from the direction immediately after the hand grips the work is an example of the third command.

A Specific Example 4 of the Undesirable Display Position Relation and a Display Example 4 of the Attention Calling Information Referring to FIG. 12, among the display position relation of the plurality of the commands arrayed in the work sequence, a specific example 4 of the undesirable display position relation and a display example 4 of the attention calling information will be described below.

Figure 12:
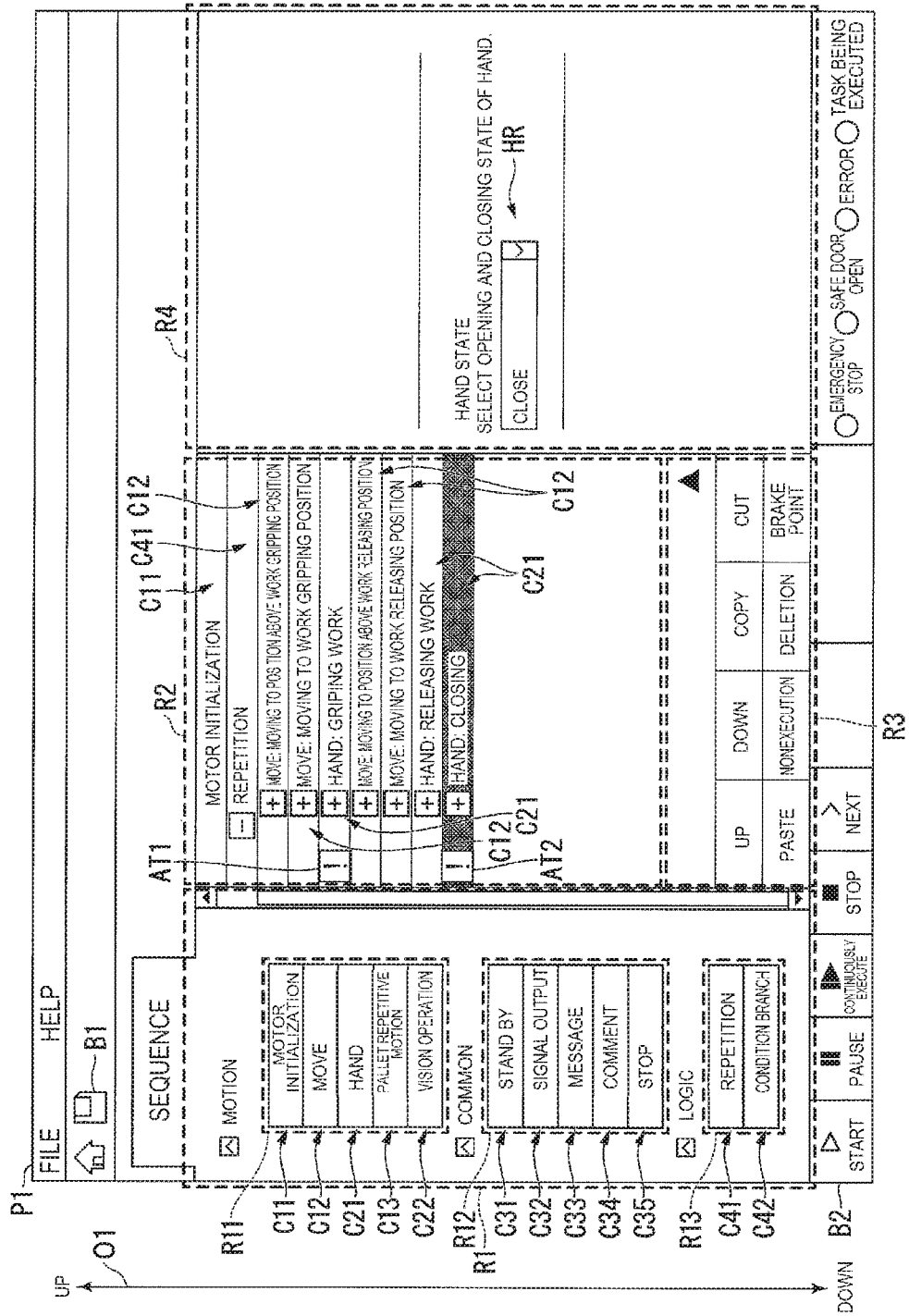
FIG. 12 is a diagram showing still another example of the image displayed when the attention calling information is displayed.

FIG. 12 is a diagram showing still another example of an image P1 displayed when the attention calling information is displayed. In the example shown in FIG. 12, nine commands, that is, the first operation command C11, the logical structure command C41, the first operation command C12, the first operation command C12, the second operation command C21, the first operation command C12, the first operation command C12, the second operation command C21, and the second operation command C21 are arrayed in order from the top to the bottom in the region R2. In this example, properties are associated with respective four first operation commands C12, respective three second operation command C21, and one logical structure command C41. However, in this example, these properties are folded and are not displayed in the region R2. In this example, a third second operation command C21 counted from the top is selected by the user in the region R2. Therefore, in the region R4, an image for editing content of one second property associated with the second operation command C21 is displayed. As shown in FIG. 12, the one second property is a second property for designating opening and closing the hand serving as the operation of the hand.

In the example shown in FIG. 12, a fourth property for designating a condition for repeatedly executing target processing is associated with a first logical structure command C41 counted from the top in the region R2. However, as explained above, in this example, the fourth property is folded and is hidden in the region R2.

In the example shown in FIG. 12, in the region R2, commands repeatedly executed by the logical structure command C41, that is, the respective four first operation commands C12 and the respective two second operation commands C21 are displayed as low order nodes together with the logical structure command C41. Display positions where the six commands are displayed as the low order nodes of the logical structure command C41 among the display positions in the region R2 are examples of the associated display positions associated with the logical structure command C41. The associated display positions are, among the display positions in the region R2, display positions where the commands serving as the low order nodes of the logical structure command C41 are located.

In the example shown in FIG. 12, a first first operation command C12 counted from the top in the region R2 is shown as "move: moving to the position above the work gripping position". This indicates that, in FIG. 12, a first property for designating the "position above the work gripping position" as the moving destination of the movable section A is associated with the first operation command C12. However, as explained above, in this example, the first property is folded and is hidden in the region R2. Although not shown in the region R2, in the following explanation, as an example, a first property for designating the "high speed" as the speed for operating the movable section A is associated with the first operation command C12. Although not shown in the region R2, in the following explanation, as an example, a first property for designating the "method of operation by control for minimizing turning angles of joints of the movable section A" as the method of the operation of the movable section A is associated with the first operation command C12.

In the example shown in FIG. 12, a second first operation command C12 counted from the top in the region R2 is shown as "move: moving to a work gripping position". This indicates that, in FIG. 12, a first property for designating the "work gripping position" as the moving destination of the movable section A is associated with the first operation command C12. However, as explained above, in this example, the first property is folded and is hidden in the region R2. Although not shown in the region R2, in the following explanation, as an example, a first property for designating the "low speed" as the speed for operating the movable section A is associated with the first operation command C12. Although not shown in the region R2, in the following explanation, as an example, a first property for designating the "method of operation by control for minimizing turning angles of joints of the movable sections A" as the method of the operation of the movable section A is associated with the first operation command C12.

In the example shown in FIG. 12, a first second operation command C21 counted from the top in the region R2 is shown as "hand: gripping work". This indicates that, in FIG. 12, a second property for designating "moving the plurality of fingers of the hand in the direction in which the plurality of fingers move close to one another and closing the hand" as the operation of the hand is associated with the second operation command C21. However, as explained above, in this example, the second property is folded and is hidden in the region R2.

In the example shown in FIG. 12, the third first operation command C12 counted from the top in the region R2 is shown as "move: moving to the position above the work releasing position". This indicates that, in FIG. 12, a first property for designating the "position above the work releasing position" as the moving destination of the movable section A is associated with the first operation command C12. However, as explained above, in this example, the first property is folded and is hidden in the region R2. Although not shown in FIG. 12, in the following explanation, as an example, a first property for designating the "high speed" as the speed for operating the movable section A is associated with the first operation command C12. Although not shown in the region R2, in the following explanation, as an example, a first property for designating the "method of operation by control for minimizing turning angles of joints of the movable section A" as the method of the operation of the movable section A is associated with the first operation command C12.

In the example shown in FIG. 12, the third first operation command C12 counted from the top in the region R2 is shown as "move: moving to a work releasing position". This indicates that, in FIG. 12, a first property for designating the "work releasing position" as the moving destination of the movable section A is associated with the first operation command C12. However, as explained above, in this example, the first property is folded and is hidden in the region R2. Although not shown in FIG. 12, in the following explanation, as an example, a first property for designating the "low speed" as the speed for operating the movable section A is associated with the first operation command C12. Although not shown in the region R2, in the following explanation, as an example, a first property for designating the "method of operation by control for minimizing turning angles of joints of the movable section A" as the method of the operation of the movable section A is associated with the first operation command C12.

In the example shown in FIG. 12, a second second operation command C21 counted from the top in the region R2 is shown as "hand: releasing work". This indicates that, in FIG. 12, a second property for designating "moving the plurality of fingers of the hand in the direction in which the plurality of fingers move away from one another and opening the hand" as the operation of the hand is associated with the second operation command C21. However, as explained above, in this example, the second property is folded and is hidden in the region R2.

In the example shown in FIG. 12, a third second operation command C21 counted from the top in the region R2 is shown as "hand: closing". This indicates that, in FIG. 12, a second property for designating "moving the plurality of fingers of the hand in the direction in which the plurality of fingers move close one another and closing the hand" as the operation of the hand is associated with the second operation command C21. However, as explained above, in this example, the second property is folded and is hidden in the region R2.

In the example shown in FIG. 12, the region R4 includes a pulldown menu HR as a GUI.

In the example shown in FIG. 12, "close" is displayed on the pulldown menu HR. In this example, the "close" indicates "moving the plurality of fingers of the hand in the direction in which the plurality of fingers move close to one another and closing the hand" among the plurality of operations predetermined as the operation of the hand. That is, in this example, in the pulldown menu HR, "moving the plurality of fingers of the hand in the direction in which the plurality of fingers move close to one another and closing the hand" is selected as the operation of the hand.

In the example shown in FIG. 12, among a plurality of commands repeatedly executed in a work sequence displayed in the region R2, the number of the second operation commands C21 for opening the hand and the number of the second operation commands C21 for closing the hand are different numbers. That is, in this example, among the plurality of commands, the respective second operation commands C21 for opening the hand are associated with the second operation commands C21 for closing the hand in a one to one relation. In this case, the robot 20 controlled by an operation program based on the work sequence performs, during the repeated operation, operation of the hand for gripping again the work released by the hand once, operation of the hand for releasing again the work gripped by the hand once, operation for further opening the hand in a state in which the hand is opened, operation for further closing the hand in a state in which the hand is closed, and the like.

Figure 13:
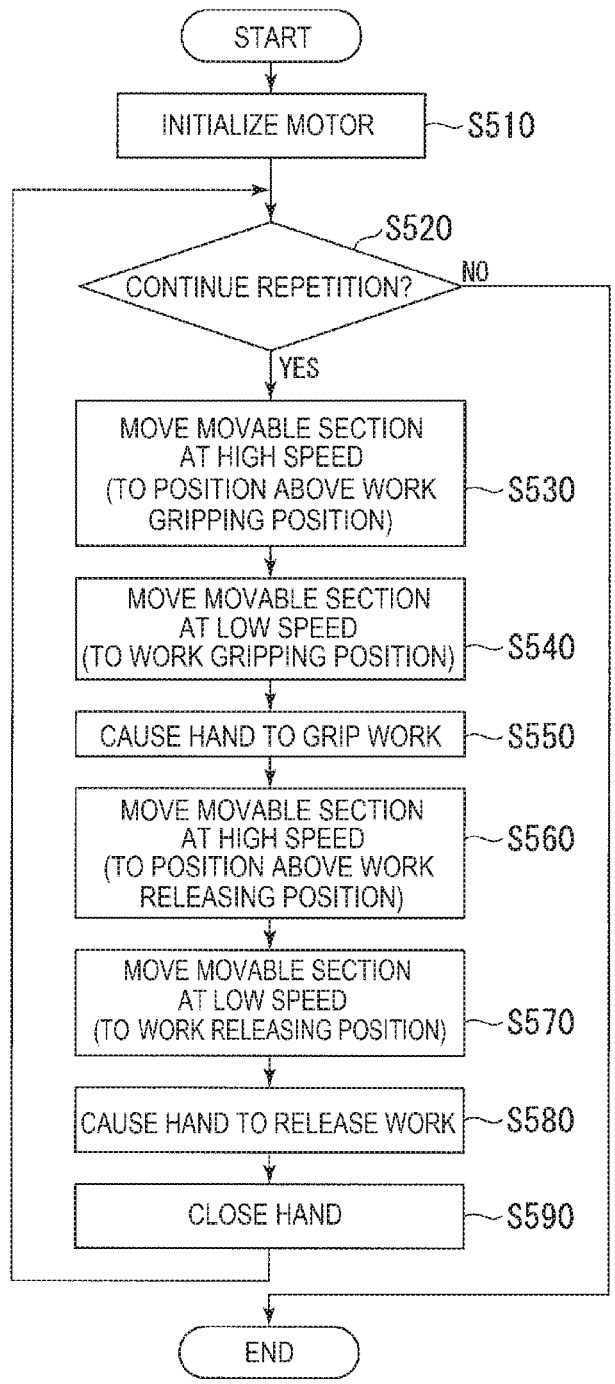
FIG. 13 is a diagram showing an example of a flow of processing of the robot control device that operates the robot according to an operation program based on a work sequence shown in FIG. 12.

More specifically, the robot control device 40 acquires the operation program based on the work sequence shown in FIG. 12 from the information processing device 50, performs a flowchart of FIG. 13 based on the acquired operation program, and operates the robot 20. FIG. 13 is a diagram showing an example of a flow of the processing of the robot control device 40 that operates the robot 20 according to the operation program based on the work sequence shown in FIG. 12.

The robot control device 40 performs initialization of the respective first to fourth actuators included in the robot 20 (step S510). The processing of step S510 is processing performed by the robot control device 40 according to a first first operation command C11 counted from the top in the region R2 shown in FIG. 12.

Subsequently, the robot control device 40 determines whether repetition of processing of steps S530 to S590 is continued (step S520). The processing of step S520 is processing performed by the robot control device 40 according to the first logical structure command C41 counted from the top in the region R2 shown in FIG. 12. In step S520, the robot control device 40 determines whether a condition designated by a fourth property associated with the logical structure command C41 is satisfied to thereby determine whether the repetition of the processing of steps S530 to S590 is continued. When determining that the condition is not satisfied, the robot control device 40 determines that the repetition of the processing is not continued. On the other hand, when determining that the condition is satisfied, the robot control device 40 determines that the repetition of the processing is continued.

When determining that the repetition of the processing of steps S530 to S590 is not continued (NO in step S520), the robot control device 40 ends the processing.

On the other hand, when determining that the repetition of the processing of steps S530 to S590 is continued (YES in step S520), the robot control device 40 controls the robot 20 and moves the movable section A at the "high speed" to the "position above the work gripping position" shown in FIG. 12 among predetermined positions (step S530). The processing of step S530 is processing performed by the robot control device 40 according to the first first operation command C12 counted from the top in the region R2 shown in FIG. 12.

Subsequently, the robot control device 40 controls the robot 20 and moves the movable section A at the "low speed" to the "work gripping position" shown in FIG. 12 among the predetermined positions (step S540). The processing of step S540 is processing performed by the robot control device 40 according to the second first operation command C12 counted from the top in the region R2 shown in FIG. 12.

Subsequently, the robot control device 40 controls the hand, moves the plurality of fingers of the hand in the direction in which the plurality of fingers move close to one another and closes the hand, and causes the hand to grip the work (step S550). The processing of step S550 is processing performed by the robot control device 40 according to the first second operation command C21 counted from the top in the region R2 shown in FIG. 12.

Subsequently, the robot control device 40 controls the robot 20 and moves the movable section A at the "high speed" to the "position above the work releasing position" among the predetermined positions (step S560). The processing of step S560 is processing performed by the robot control device 40 according to the third first operation command C12 counted from the top in the region R2 shown in FIG. 12.

Subsequently, the robot control device 40 controls the robot 20 and moves the movable section A at the "low speed" to the "work releasing position" among the predetermined positions (step S570). The processing of step S570 is processing performed by the robot control device 40 according to a fourth first operation command C12 counted from the top in the region R2 shown in FIG. 12.

Subsequently, the robot control device 40 controls the hand, moves the plurality of fingers of the hand in the direction in which the plurality of fingers move away from one another and closes the hand, and causes the hand to release the work (step S580). The processing of step S580 is processing performed by the robot control device 40 according to the second second operation command C21 counted from the top in the region R2 shown in FIG. 12.

Subsequently, the robot control device 40 controls the hand, moves the plurality of fingers of the hand in the direction in which the plurality of fingers move close to one another and closes the hand (step S590). The processing of step S590 is processing performed by the robot control device 40 according to the third second operation command C21 counted from the top in the region R2 shown in FIG. 12. After the processing of step S590 is performed, the robot control device 40 shifts to step S520 and determines again whether the repetition of the processing of steps S530 to S590 is continued.

In this way, the robot control device 40 acquires the operation program based on the work sequence shown in FIG. 12 from the information processing device 50, performs a processing of a flowchart shown in FIG. 13 based on the acquired operation program, and operates the robot 20.

In the repeated processing of steps S520 to S590, although the robot control device 40 causes the hand to grip the work in step S550 and causes the hand to release the work in step S580, the robot control device 40 closes the hand in step S590. In this case, in step S590, the robot 20 causes the hand to grip again the work released by the hand in step S580. As a result, in the repeated processing, for example, the robot 20 causes the work gripped by the hand to interfere with work gripped by the hand next. That is, a display position relation in which the second operation command C21 for closing the hand is located in an associated display position associated with the logical structure command C41 and the second operation command C21 for opening the hand is not located in the associated display position associated with the logical structure command C41 is an undesirable display position relation. A display position relation in which the second operation command C21 for opening the hand is located in the associated display position associated with the logical structure command C41 and the second operation command C21 for closing the hand is not located in the associated display position associated with the logical structure command C41 is an undesirable display position relation. To put it more plainly, when the second operation command C21 is included in a command repeatedly executed by the logical structure command C41, a display position relation in which the second operation command C21 for closing the hand and the second operation command C21 for opening the hand are not associated in a one to one relation is an undesirable display position relation.

Therefore, display position relation information including third display position relation information is stored in advance in the memory 52 of the information processing device 50. The third display position relation information means information indicating a third display position relation. The third display position relation is a display position relation in which the second operation command C21 for closing the hand is located in the associated display position associated with the logical structure command C41 and the second operation command C21 for opening the hand is not located in the associated display position associated with the logical structure command C41. The third display position relation means a display position relation in which the second operation command C21 for opening the hand is located in the associated display position associated with the logical structure command C41 and the second operation command C21 for closing the hand is not located in the associated display position associated with the logical structure command C41. As shown in FIG. 12, when a display position relation between the logical structure command C41 and one or more second operation command C21 located in the associated display position associated with the logical structure command C41 coincides with the third display position relation indicated by the third display position relation information stored in the memory 52, the display control section 561 causes the display section 55 to display the attention calling information AT. In the example shown in FIG. 12, the attention calling information AT is displayed as attention calling information AT1 on the left side of the first second operation command C21 counted from the top in the region R2. In this example, the attention calling information AT is displayed as attention calling information AT2 on the left side of the third second operation command C21 counted from the top in the region R2. A display position where the attention calling information AT is displayed may be another display position on the display section 55 instead of this. The number of displays of the attention calling information AT may be only one or may be three or more instead of this. Consequently, the user can easily specify a part or all of two or more commands that are in an undesirable display position relation. The second operation command C21 repeatedly executed by the logical structure command C41 is an example of the respective first to fourth commands. The logical structure command C41 is an example of the second command.

Even if the logical structure command C41 shown in FIG. 12 is replaced with the logical structure command C42, the same problems occur. Therefore, even in this case, the information processing device 50 can display the attention calling information according to the same method.

Figure 14:
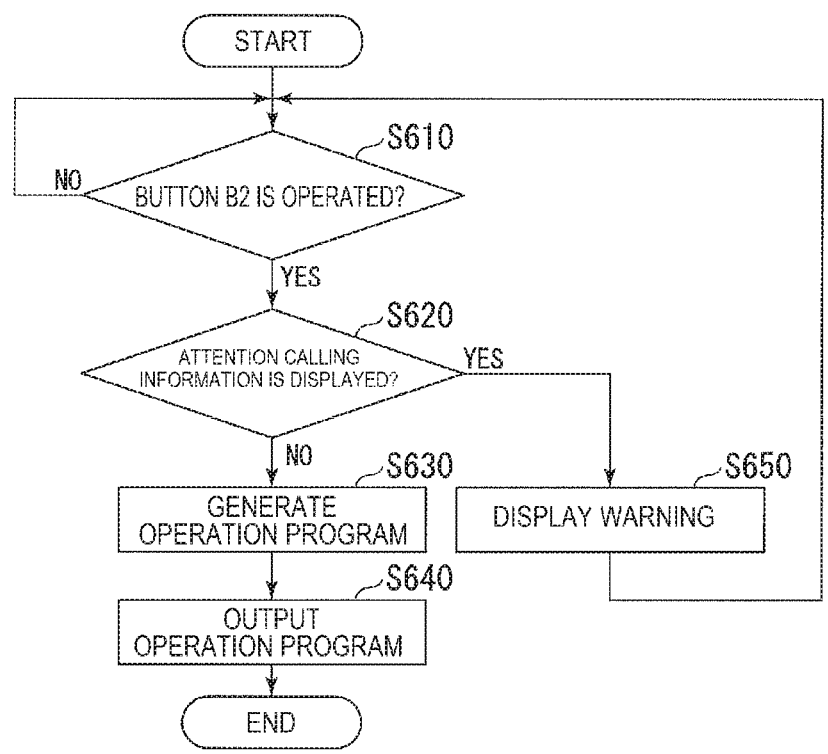
FIG. 14 is a diagram showing an example of a flow of processing performed by the information processing device when attention calling information is displayed on a display section.

Processing Performed by the Information Processing Device when the Attention Calling Information is Displayed Processing performed by the information processing device 50 when the attention calling information AT is displayed on the display section 55 is explained below with reference to FIG. 14. FIG. 14 is a diagram showing an example of a flow of the processing performed by the information processing device 50 when the attention calling information AT is displayed on the display section 55. In the following explanation, processing of the information processing device 50 for not starting generation of an operation program in the processing is explained.

The generating section 563 stays on standby until operation is performed on the button B2 (step S610).

When determining that operation is performed on the button B2 (YES in step S610), the generating section 563 determines whether the attention calling information AT is displayed on the image P1 (step S620).

When determining that the attention calling information AT is not displayed on the image P1 (NO in step S620), the generating section 563 generates an operation program based on a work sequence in which a plurality of commands are arrayed in the region R2 (step S630).

Subsequently, the output section 565 outputs the operation program generated by the generating section 563 in step S630 to the robot control device 40 and causes the robot control device 40 to execute the operation program (step S640) and ends the processing.

On the other hand, when the generating section 563 determines that the attention calling information AT is displayed on the image P1 (YES in step S620), the display control section 561 causes the display section 55 to display warning information (step S650). The warning information means information indicating a warning for urging the user to correct a display position relation among a plurality of commands arrayed in the region R2 to extinguish the display of the attention calling information AT. The information may be a message or may be an image. After the processing of step S650 is performed, the generating section 563 shifts to step S610 and stays on standby again until operation is performed on the button B2.

In this way, when the attention calling information AT is displayed on the display section 55, the information processing device 50 does not cause the generating section 563 to start generation of an operation program. Consequently, the information processing device 50 can be prevented from causing the robot control device 40 to execute an operation program based on a work sequence in which a plurality of commands are arrayed in the region R2 in this case. That is, when the attention calling information AT is displayed on the display section 55, the control device 30 is incapable of executing the work sequence until the display of the attention calling information AT on the display section 55 is deleted. Consequently, the control device 30 can be more surely prevented from causing the robot 20 to perform unintended operation according to a work sequence created by the user. More specifically, for example, the control device 30 can more surely prevent the robot 20 from interfering with another object according to the work sequence created by the user.

The information processing device 50 explained above may include a setting section that sets display position relation information according to operation received from the user. Consequently, the information processing device 50 can cause the display section 55 to display the attention calling information AT according to whether any one of display position relations between two or more commands among the plurality of commands arrayed in the region R2 coincides with a display position relations that the user considers undesirable.

The display position relation information explained above may include a part or all of the eleventh display position relation information, the twelfth display position relation information, the second display position relation information, and the third display position relation information.

The display position relation information explained above may include information indicating other display position relations instead of a part or all of the eleventh display position relation information, the twelfth display position relation information, the second display position relation information, and the third display position relation information.

As explained above, a control device according to an aspect is a control device that controls a robot based on a work sequence in which a plurality of commands including a first command and a second command are arrayed, the control device including: a display control section configured to display the work sequence on a display section; and a storing section configured to store display position relation information including first display position relation information indicating a relative first display position relation between a display position of the first command in the work sequence displayed on the display section and a display position of the second command in the work sequence displayed on the display section. When a relative display position relation between the first command and the second command and the first display position relation indicated by the first display position relation information stored in the storing section coincide in the work sequence, the display control section causes the display section to display attention calling information. The first command is a command for operating a hand. Consequently, the control device can prevent the robot from interfering with another object according to a work sequence created by a user.

In the control device, a configuration may be used in which the first display position relation indicated by the first display position relation information is a display position relation in which the second command is located immediately before the first command in the work sequence displayed on the display section.

In the control device, a configuration may be used in which the second command is a command for moving the movable section included in the robot faster than predetermined speed.

In the control device, a configuration may be used in which the predetermined speed is highest speed among a predetermined plurality of speeds different from one another.

In the control device, a configuration may be used in which the robot is a SCARA robot including a movable section and a shaft provided in the movable section and configured to move in a first direction in which the shaft approaches or separates from a setting surface of the robot, and the second command is a command for moving the shaft provided in the movable section in the first direction.

In the control device, a configuration may be used in which the plurality of commands includes a third command, the display position relation information includes second display position relation information indicating a relative second display position relation among the first command, the second command, and the third command, the second command is a command for moving the movable section included in the robot in the second direction, the third command is a command for moving the movable section included in the robot in a third direction different from both of the second direction and a direction opposite to the second direction, the second display position relation indicated by the second display position relation information is a display position relation in which the second command is located immediately before the first command in the work sequence displayed on the display section and is a display position relation in which the third command is located immediately after the first command in the work sequence displayed on the display section, and the display control section causes the display section to display the attention calling information when a relative display position relation among the first command, the second command, and the third command and the second display position relation indicated by the second display position relation information stored in the storing section coincide in the work sequence.

In the control device, a configuration may be used in which the plurality of commands includes a fourth command, the display position relation information includes third display position relation information indicating a relative third display position relation among the first command, the second command, and the fourth command, the second command is a command for repeating one or more commands located in associated display positions associated with the second command among display positions in the work sequence, the first command is a command included in the one or more commands and for causing the hand to perform one of opening and closing of the hand, the fourth command is a command for causing the hand to perform the other of the opening and the closing of the hand, the third display position relation indicated by the third display position relation information is a display position relation in which the first command is located in the associated display position and the fourth command is not located in the associated display position, and the display control section causes the display section to display the attention calling information when a relative display position relation among the first command, the second command, and the fourth command and the third display position relation indicated by the third display position relation information stored in the storing section coincide in the work sequence.

In the control device, a configuration may be used in which the control device includes a setting section configured to set the display position relation information according to operation received from the user.

In the control device, a configuration may be used in which, when the attention calling information is displayed on the display section, the work sequence is inexecutable until the display of the attention calling information on the display section is deleted.

The embodiment of the present disclosure is explained in detail above with reference to the drawings. However, a specific configuration is not limited to this embodiment and may be, for example, changed, replaced, or deleted without departing from the gist of the present disclosure.

A program for realizing a function of any component in the device explained above may be recorded in a computer-readable recording medium and read and executed by a computer system. The device is, for example, the robot 20, the control device 30, the robot control device 40, or the information processing device 50. The "computer system" includes an OS (Operating System) and hardware such as peripheral devices. The "computer readable recording medium" means a portable medium such as a flexible disk, a magneto-optical disk, a ROM, or a CD (Compact Disk)-ROM or a storage device such as a hard disk incorporated in the computer system. Further, the "computer-readable recording medium" includes a recording medium that retains the program for a fixed time like a volatile memory inside the computer system functioning as a server or a client to which the program is transmitted via a network such as the Internet or a communication line such as a telephone line.

The program may be transmitted from the computer system in which the program is stored in the storage device or the like to another computer system via a transmission medium or a transmission wave in the transmission medium. The "transmission medium" that transmits the program means a medium having a function of transmitting information like a network such as the Internet or a communication line such as a telephone line.

The program may be a program for realizing a part of the functions explained above. Further, the program may be a program that can realize the functions in a combination with a program already recorded in the computer system, a so-called differential file or a differential program.

What is claimed is:

1. A control device that controls a robot, the control device comprising:
   a display having a screen, the screen being divided into first, second, and third areas next to each other;
   a memory configured to store a program and unintended operation information of a plurality of commands in a work sequence for operating the robot, the unintended operation information corresponding to an unintended operation state in which a hand of the robot interferes with another object; and a processor configured to execute the program so as to:
  display the plurality of commands on the first area of the screen;
  receive the work sequence via an input device, the received work sequence including at least a first command and a second command of the plurality of commands, the first command being for operating the hand of the robot;
  display the received work sequence on the second area of the screen;
  display a plurality of properties on the third area of the screen, the plurality of properties corresponding to the first command in the displayed work sequence;
  receive selection of a first property of the plurality of properties via the input device and display the received first property on the third area of the screen;
  determine whether a first displayed sequence order of the first and second commands on the second area of the screen in consideration of the first property associating with the first command matches the unintended operation state of the unintended operation information;
  display attention calling information next to either the first command or the second command on the second area of the screen when the processor determines that the first displayed sequence order of the first and second commands in consideration of the first property matches the unintended operation state of the unintended operation information;
  determine whether either the first command or the second command on the second area of the screen is deleted via the input device after the attention calling information is displayed;
  be on standby until a new work sequence is received via the input device;
  determine whether a second displayed sequence order in the new work sequence matches the unintended operation state of the unintended operation information;
  generate a robot operation program when the processor determines that the second displayed sequence order in the new work sequence does not match the unintended operation state of the unintended operation information; and
  operate the robot based on the robot operation program.

2. The control device according to claim 1,
wherein the second command is located immediately prior to the first command in the first displayed sequence order.

3. The control device according to claim 1, wherein the second command is for moving a movable section included in the robot faster than a predetermined speed.

4. The control device according to claim 3, wherein the predetermined speed is a highest speed among a predetermined plurality of speeds.

5. The control device according to claim 1, wherein
the robot is a S.C.A.R.A. (Selective Compliance Articulated Robot Arm) including a movable section and a shaft provided in the movable section, and the shaft is configured to move in a first direction, and
the second command is for moving the shaft in the first direction.

6. The control device according to claim 1, wherein
the plurality of commands includes a third command, and the work sequence further includes the third command,
the second command is for moving a movable section included in the robot in a second direction,
the third command is for moving the movable section in a third direction different from both of the second direction and a direction opposite to the second direction,
the processor is further configured to:
  determine whether a third displayed sequence order of the first, second, and third commands on the second area of the screen in consideration of the first property associating with the first command matches the unintended operation state of the unintended operation information; and
  display the attention calling information next to either the first command, the second command, or the third command on the second area of the screen when the processor determines that the third displayed sequence order of the first, second, and third commands in consideration of the first property matches the unintended operation state of the unintended operation information, and
the second command is located immediately prior to the first command in the second displayed sequence order, and the first command is located immediately prior to the third command in the second displayed sequence order.

7. The control device according to claim 1, wherein
the plurality of commands includes a fourth command, and the work sequence further includes the fourth command,
the second command is for repeating one or more commands in the work sequence,
the first command corresponds to one of the one or more commands and is for causing the hand to perform one of opening and closing of the hand,
the fourth command is for causing the hand to perform the other of the opening and the closing of the hand, and
the processor is further configured to:
  determine whether a fourth displayed sequence order of the fourth command on the second area of the screen in consideration of the first property associating with the first command matches the unintended operation state of the unintended operation information; and
  display the attention calling information next to either the first command, the second command, or the fourth command on the second area of the screen when the processor determines that the fourth displayed sequence order matches the unintended operation state of the unintended operation information and that the first displayed sequence order does not match the unintended operation state of the unintended operation information.

8. The control device according to claim 1,
wherein the processor is configured to set the unintended operation information based on an input from a user via the input device.

9. The control device according to claim 1,
wherein, when the attention calling information is displayed on the second area of the screen, the processor does not execute the work sequence, and
after the attention calling information is disappeared form the second area of the screen, the processor is configured to execute the work sequence.

10. A robot system comprising:
a robot having a hand;
a display having a screen, the screen being divided into first, second, and third areas next to each other;
a memory configured to store a program and unintended operation information of a plurality of commands in a work sequence for operating the robot, the unintended operation information corresponding to an unintended operation state in which the hand of the robot interferes with another object; and
a processor configured to execute the program so as to:
 display the plurality of commands on the first area of the screen;
 receive the work sequence via an input device, the received work sequence including at least a first command and a second command of the plurality of commands, the first command being for operating the hand of the robot;
 display the received work sequence on the second area of the screen;
 display a plurality of properties on the third area of the screen, the plurality of properties corresponding to the first command in the displayed work sequence;
 receive selection of a first property of the plurality of properties via the input device and display the received first property on the third area of the screen;
 determine whether a first displayed sequence order of the first and second commands on the second area of the screen in consideration of the first property associating with the first command matches the unintended operation state of the unintended operation information;
 display attention calling information next to either the first command or the second command on the second area of the screen when the processor determines that the first displayed sequence order of the first and second commands in consideration of the first property matches the unintended operation state of the unintended operation information;
 determine whether either the first command or the second command on the second area of the screen is deleted via the input device after the attention calling information is displayed;
 be on standby until a new work sequence is received via the input device;
 determine whether a second displayed sequence order in the new work sequence matches the unintended operation state of the unintended operation information;
 generate a robot operation program when the processor determines that the second displayed sequence order in the new work sequence does not match the unintended operation state of the unintended operation information; and
 operate the robot based on the robot operation program.

11. A display method for causing a processor to execute a program stored in a memory, wherein the memory being configured to store unintended operation information of a plurality of commands in a work sequence for operating a robot, the unintended operation information corresponding to an unintended operation state in which a hand of the robot interferes with another object, the method comprising executing on the processor the steps of:
 dividing a screen of a display into first, second, and third areas next to each other;
 displaying the plurality of commands on the first area of the screen;
 receiving the work sequence via an input device, the received work sequence including at least a first command and a second command of the plurality of commands, the first command being for operating the hand of the robot;
 displaying the received work sequence on the second area of the screen;
 displaying a plurality of properties on the third area of the screen, the plurality of properties corresponding to the first command in the displayed work sequence;
 receiving selection of a first property of the plurality of properties via the input device and display the received first property on the third area of the screen;
 determining whether a first displayed sequence order of the first and second commands on the second area of the screen in consideration of the first property associating with the first command matches the unintended operation state of the unintended operation information;
 displaying attention calling information next to either the first command or the second command on the second area of the screen when the processor determines that the first displayed sequence order of the first and second commands in consideration of the first property matches the unintended operation state of the unintended operation information;
 determine whether either the first command or the second command on the second area of the screen is deleted via the input device after the attention calling information is displayed;
 be on standby until a new work sequence is received via the input device;
 determine whether a second displayed sequence order in the new work sequence matches the unintended operation state of the unintended operation information;
 generate a robot operation program when the processor determines that the second displayed sequence order in the new work sequence does not match the unintended operation state of the unintended operation information; and
 operate the robot based on the robot operation program.

12. The display method according to claim 11, wherein the second command is located immediately prior to the first command in the first displayed sequence order.

13. The display method according to claim 11, wherein the second command is for moving a movable section included in the robot faster than a predetermined speed.

14. The display method according to claim 13, wherein the predetermined speed is a highest speed among a predetermined plurality of speeds.

15. The display method according to claim 11, wherein the robot is a S.C.A.R.A. (Selective Compliance Articulated Robot Arm) including a movable section and a shaft provided in the movable section, and the shaft is configured to move in a first direction,
the second command is for moving the shaft in the first direction, and
the second command is located immediately prior to the first command in the first displayed sequence order.

16. The display method according to claim 11, wherein the plurality of commands includes a third command, and the work sequence further includes the third command, the second command is for moving a movable section included in the robot in a second direction, the third command is for moving the movable section in a third direction different from both of the second direction and a direction opposite to the second direction, the processor is further configured to:

determine whether a third displayed sequence order of the first, second, and third commands on the second area of the screen in consideration of the first property associating with the first command matches the unintended operation state of the unintended operation information; and display the attention calling information next to either the first command, the second command, or the third command on the second area of the screen when the processor determines that the third displayed sequence order of the first, second, and third commands in consideration of the first property matches the unintended operation state of the unintended operation information, and the second command is located immediately prior to the first command in the second displayed sequence order, and the first command is located immediately prior to the third command in the second displayed sequence order.

17. The display method according to claim 11, wherein the plurality of commands includes a fourth command, and the work sequence further includes the fourth command, the second command is for repeating one or more commands in the work sequence, the first command corresponds to one of the one or more commands and is for causing the hand to perform one of opening and closing of the hand, the fourth command is for causing the hand to perform the other of the opening and the closing of the hand, and the processor is further configured to:

determine whether a fourth displayed sequence order of the fourth command on the second area of the screen in consideration of the first property associating with the first command matches the unintended operation state of the unintended operation information; and display the attention calling information next to either the first command, the second command, or the fourth command on the second area of the screen when the processor determines that the fourth displayed sequence order matches the unintended operation state of the unintended operation information and that the first displayed sequence order does not match the unintended operation state of the unintended operation information.

\* \* \* \* \*